(12) United States Patent
Kagawa et al.

(10) Patent No.: US 10,744,665 B2
(45) Date of Patent: *Aug. 18, 2020

(54) APPARATUS FOR PRODUCING MICROPOROUS PLASTIC FILM

(71) Applicants: Seiji Kagawa, Koshigaya-shi, Saitama (JP); Atsuko Kagawa, Koshigaya-shi, Saitama (JP)

(72) Inventors: Seiji Kagawa, Koshigaya (JP); Yoichiro Kagawa, Koshigaya (JP)

(73) Assignees: Seiji Kagawa, Koshigaya-Shi (JP); Atsuko Kagawa, Koshigaya-Shi (JP)

(*) Notice: Subject to any disclaimer, the term of this patent is extended or adjusted under 35 U.S.C. 154(b) by 18 days.

This patent is subject to a terminal disclaimer.

(21) Appl. No.: 16/195,599

(22) Filed: Nov. 19, 2018

(65) Prior Publication Data

US 2019/0248035 A1 Aug. 15, 2019

(30) Foreign Application Priority Data

Feb. 14, 2018 (JP) .................................. 2018-24105

(51) Int. Cl.
*B29C 59/04* (2006.01)
*B26D 1/40* (2006.01)
(Continued)

(52) U.S. Cl.
CPC ............. *B26D 1/405* (2013.01); *B26D 5/007* (2013.01); *B26D 5/086* (2013.01); *B26D 7/265* (2013.01);
(Continued)

(58) Field of Classification Search
None
See application file for complete search history.

(56) References Cited

U.S. PATENT DOCUMENTS 3,273,199 A * 9/1966 Kleinewefers ....... B01D 35/005
425/335
5,352,108 A 10/1994 Kagawa et al.
(Continued)

FOREIGN PATENT DOCUMENTS

JP   6-71598 A    3/1994
JP   6-328483 A   11/1994
(Continued)

OTHER PUBLICATIONS

Japanese Office Action issued in Japanese Patent Application No. 2018-024105 dated May 22, 2018.

*Primary Examiner* — Peter L Vajda
*Assistant Examiner* — Asha A Thomas
(74) *Attorney, Agent, or Firm* — Birch, Stewart, Kolasch & Birch, LLP

(57) ABSTRACT

An apparatus for producing a microporous plastic film comprising a pair of vertical columns; a pair of stationary frames each fixed to each vertical column such that they are positioned inside the vertical columns; a pair of movable frames rotatable under the stationary frames; a pattern roll rotatably supported by the stationary frames at a fixed position; an anvil roll movable up and down along first vertical guide rails of the stationary frames; and a lower backup roll movable up and down along second vertical guide rails of the movable frames; the pattern roll being in parallel with the anvil roll; the first and second vertical guide rails being distant from the vertical columns on one side, such that rotating movable frames and lower backup roll do not come into contact with the vertical columns; with the lower backup roll inclined to the anvil roll in a horizontal plane, large numbers of fine pores being formed on the plastic film by the high-hardness, fine particles of the pattern roll.

8 Claims, 17 Drawing Sheets

(51) Int. Cl.
 B26D 5/00 (2006.01)
 B26D 5/08 (2006.01)
 B26F 1/22 (2006.01)
 B26D 7/26 (2006.01)

(52) U.S. Cl.
 CPC .............. B26F 1/22 (2013.01); B29C 59/04 (2013.01); B26D 2007/2692 (2013.01)

(56) References Cited

U.S. PATENT DOCUMENTS

| | | |
|---|---|---|
| 5,451,257 A | 9/1995 | Kagawa et al. |
| 5,648,107 A * | 7/1997 | Kagawa .................... B26F 1/24 425/363 |
| 5,839,313 A | 11/1998 | Ginzburg |
| 6,210,145 B1 * | 4/2001 | Seide ..................... B29C 43/22 425/194 |
| 2018/0178442 A1 | 6/2018 | Kagawa et al. |

FOREIGN PATENT DOCUMENTS

| | | |
|---|---|---|
| JP | 7-165256 A | 6/1995 |
| JP | 10-193454 A | 7/1998 |
| JP | 6125707 B1 | 5/2017 |

* cited by examiner

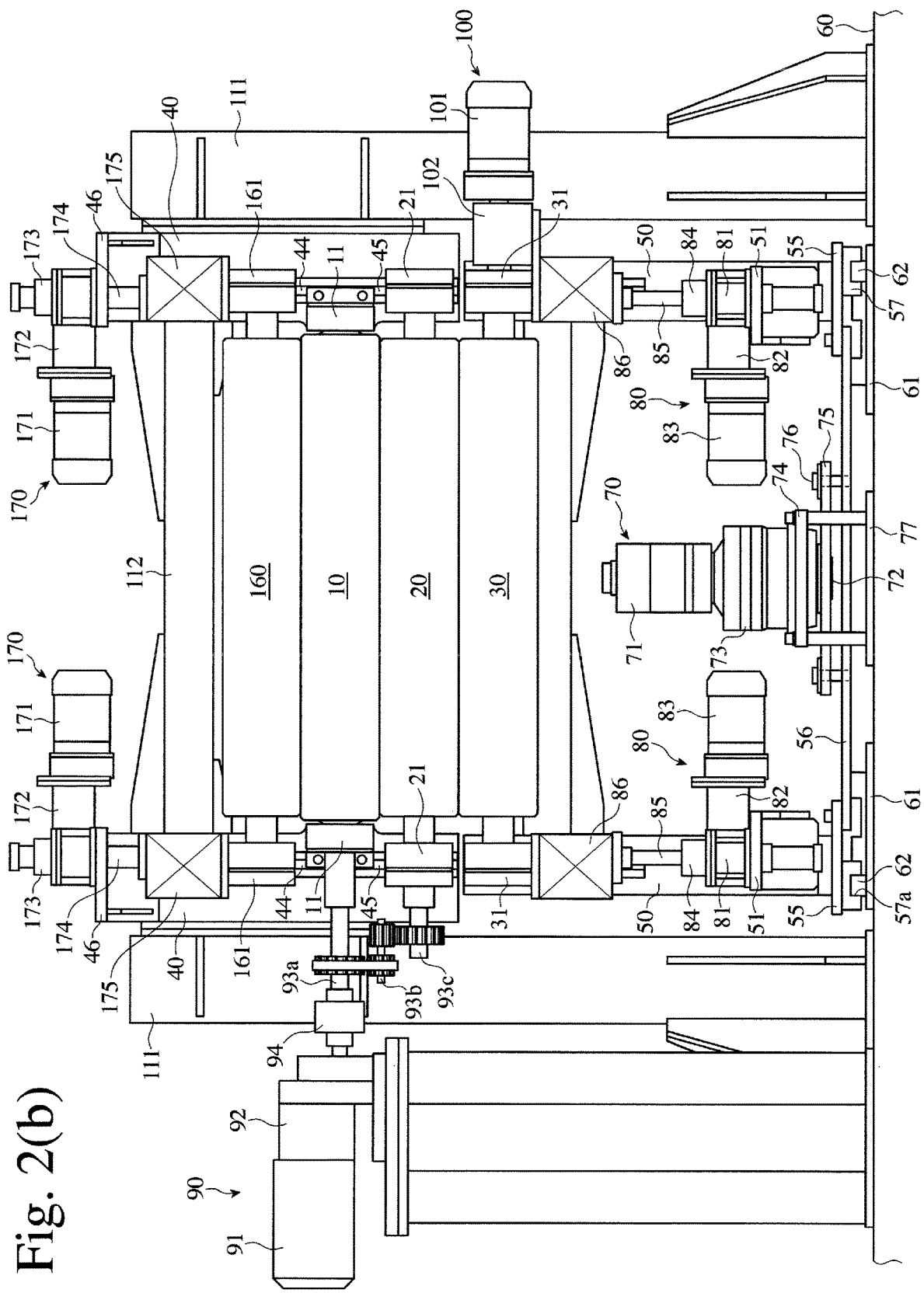

APPARATUS FOR PRODUCING MICROPOROUS PLASTIC FILM

FIELD OF THE INVENTION

The present invention relates to a small apparatus for efficiently producing a microporous plastic film by quickly making uniform a width-direction distribution of fine pores.

BACKGROUND OF THE INVENTION

Breads, cookies, vegetables, fermented foods such as fermented soybeans and kimchi, etc. have been conventionally sold in a state wrapped in paper or plastic bags. Though paper bags have high air permeability and moisture permeability, they are disadvantageous in not permitting their contents to be seen. On the other hand, plastic bags permit contents to be seen, but they are disadvantageous in not having sufficient air permeability and moisture permeability, and extremely deteriorating the flavor and texture of foods.

To obtain a plastic film permitting contents to be well seen, while having high air permeability and moisture permeability, apparatuses for forming large numbers of fine pores in a plastic film are known. For example, JP 6-71598 A discloses an apparatus for producing a microporous film comprising a means for supplying a long plastic film, a pattern roll having large numbers of high-hardness, fine particles having sharp edges and Mohs hardness of 5 or more fixed to its rolling surface, an anvil roll (metal roll) having a flat rolling surface and rotatable in an opposite direction to that of the pattern roll, a pressure-adjusting means disposed near both ends of either one roll for adjusting a pressing force to the long plastic film, and a means for applying high voltage to the pattern roll, either one or both of the pattern roll and the anvil roll being movable in their arrangement direction. The pattern roll and the anvil roll are arranged in parallel, and the long plastic film passing through a gap therebetween is provided with large numbers of fine pores by large numbers of high-hardness, fine particles on the pattern roll.

However, when large numbers of fine pores are formed in a plastic film (not shown) as thick as about 8-100 μm passing through a gap between the pattern roll 10 and the anvil roll 20, a large load is applied to the pattern roll 10 and the anvil roll 20, so that both rolls 10, 20 tend to be bent, resulting in a gap G, which is wider in a width-direction center portion than in both side edge portions, as shown in FIG. 13. Fine pores formed by an uneven gap G have different characteristics (opening diameters, depths, areal density, etc.) between a width-direction center portion and both side edge portions of the film, failing to obtain a microporous plastic film having transversely uniform air permeability.

To prevent the bending of a pattern roll 10 and an anvil roll 20, it may be considered to arrange backup rolls above the pattern roll 10 and/or under the anvil roll 20. However, it has been found that such backup rolls fail to prevent the bending of the pattern roll 10 and the anvil roll 20 sufficiently. In addition, because of large numbers of high-hardness, fine particles attached to a rolling surface of the pattern roll 10, a backup roll arranged above the pattern roll 10 should be a soft-surface rubber roll, etc., failing to sufficiently prevent the bending of the pattern roll 10.

JP 6-328483 A discloses an apparatus for calendaring a film of a thermoplastic polymer or rubber by six rolls arranged in substantially parallel, a sixth roll being arranged just under first to fifth rolls; and comprising a crossing means for inclining the fifth roll by a small angle. However, the angle of the fifth roll inclined by the crossing means is constant, and the calendaring apparatus does not have a driving means for obtaining a desired inclination angle. Accordingly, even if this calendaring apparatus were used to form fine pores in a plastic film, fine pores having various sizes and distributions cannot be formed uniformly in a width direction.

To solve the above problems, the present inventor previously proposed by Japanese Patent 6125707 an apparatus for producing a microporous plastic film, which comprises a pattern roll rotatably supported by a pair of laterally arranged stationary frames; an anvil roll movable up and down along a pair of laterally arranged movable frames, such that the anvil roll is brought into contact with the pattern roll via a plastic film; a conveying means for passing the plastic film through a gap between the pattern roll and the anvil roll; a first driving means for rotating a pair of the movable frames; a second driving means each mounted to each of the movable frames for moving up and down the anvil roll; a third driving means for rotating the pattern roll; and a fourth driving means for rotating the anvil roll; in a state where the anvil roll is inclined to the pattern roll in a horizontal plane by the operation of the first driving means, the plastic film passing through a gap between the pattern roll and the anvil roll, so that the high-hardness, fine particles form large numbers of fine pores in the plastic film.

The above apparatus can form fine pores having various sizes and distributions uniformly in a width direction, but it has been found that it suffers in actual production the following problem: A long microporous plastic film having insufficient width-direction uniformity of fine pores is inevitably formed until reaching the optimum inclination angle of the anvil roll, because the optimum inclination angle of the anvil roll to the pattern roll is determined by repeating slight change of the inclination angle of the anvil roll and the measurement of transverse distribution of fine pores. Accordingly, an apparatus capable of quickly making uniform the width-direction distribution of fine pores is desired.

In the rolling of a steel sheet S as shown in FIG. 14, a pair of work rolls 210, 220 are inclined, with backup rolls 211, 221 arranged for both work rolls 210, 220, there is no inclination angle between each work roll 210, 220 and each backup roll 211, 221. Accordingly, a slanted force is applied to the steel sheet S in the structure as shown in FIG. 14. Though the steel sheet S having sufficient strength can withstand the slanted force, a lower-strength plastic film likely suffers wrinkling and rupture, failing to conduct quick inclination of the work rolls 210, 220. Such simple arrangement of backup rolls on both sides of inclined pattern roll and anvil roll cannot achieve quick optimization of the inclination angle of one work roll, failing to produce a microporous plastic film efficiently.

Dry foods such as instant coffee, powdered milk, tea, etc. are contained in bags of aluminum-vapor-deposited plastic films, etc. having good sealability for protecting them from oxygen and moisture. The aluminum-vapor-deposited plastic film is composed of, for example, a high-strength polyethylene terephthalate (PET) film, a print layer, a vapor-deposited layer, and a heat-sealing layer. Most aluminum-vapor-deposited plastic film bags are provided with notches for tearing.

However, because of a vapor-deposited aluminum layer, a heat-sealing layer and a print layer laminated with a PET film, it is sometimes not easy to tear the aluminum-vapor-deposited plastic film even with a notch. Particularly a heat-sealed portion of the aluminum-vapor-deposited plastic film bag is as thick as two times, tearing from the notch is often stopped by the heat-sealed portion.

In view of the above circumstances, as a film easily tearable from any point without a notch, the present inventor previously proposed by JP 7-165256 A, an easy-to-tear plastic laminate film comprising a porous film of polyester, nylon or oriented polypropylene having penetrating pores or unpenetrating pores having an average opening diameter of 0.5-100 µm at a density of 1000/cm$^2$ or more on the entire surface, and a heat-fusible polymer film laminated to one surface of the porous film. However, this easy-to-tear plastic film having penetrating pores cannot be used for applications which must have completely no permeation of oxygen and moisture.

As a plastic film having only unpenetrating fine pores, JP 10-193454 A discloses a tubular film as thick as 5-150 µm, which is made of a polyolefinic resin composition containing inorganic fillers, one or both of its inner and outer surfaces being corona-discharged, and at least part of it being embossed. Embosses are as deep as ½ to ¹⁄₁₀ of the film thickness (measured according to JIS B 0601), and usually as wide as 0.5-300 mm. However, these embosses are too large, failing to make the tubular film easy to tear, and deteriorating the appearance of the tubular film. If fine embosses were to be formed for easiness to tear, an extremely expensive emboss roll having large numbers of fine projections would have to be used, inevitably resulting in an expensive embossed film.

Also, even when only unpenetrating fine pores are formed on a plastic film, it suffers uneven distribution of unpenetrating pores. To solve this problem, a pressing force applied to the plastic film by a pattern roll and an anvil roll should be uniform in a transverse direction, but the structure described in Japanese Patent 6125707 is not necessarily optimum to quickly make the pressing force uniform in a transverse direction.

U.S. Pat. No. 5,839,313 discloses, as shown in FIG. 15, a rolling mill comprising a pair of work rolls 301, 302, backup rolls 303, 304 each pushing each work roll 301, 302, and an immediate roll 305 disposed between the upper work roll 301 and the upper backup roll 303, a pair of work rolls 301, 302 and a pair of backup rolls 303, 304 being all in parallel, and only the immediate roll 305 being inclined to a pass line. The rolling mill of U.S. Pat. No. 5,839,313 can prevent the transverse deviation (strip walking) of a thin metal strip, but it is difficult to make this rolling mill smaller because it has a structure in which all rolls are supported by the laterally arranged frames.

OBJECT OF THE INVENTION

Accordingly, an object of the present invention is to provide a small apparatus capable of producing a microporous plastic film efficiently by quickly making uniform a width-direction distribution of large numbers of fine pores.

SUMMARY OF THE INVENTION

As a result of intensive research in view of the above object, the inventor has found that by combining a pattern roll 10 and an anvil roll 20 for forming fine pores in a plastic film with a lower backup roll 30 as shown in FIG. 1, and by inclining the lower backup roll 30 to the anvil roll 20 by a small angle θ in a horizontal plane while keeping the pattern roll 10 and the anvil roll 20 in parallel, the pattern roll 10 and the anvil roll 20 slightly bent by stress during forming fine pores can be quickly freed from bending, without generating troubles such as wrinkling, rupture, etc. in the plastic film, thereby quickly achieving a uniform width-direction distribution of large numbers (pluralities) of fine pores in a wide plastic film. The present invention has been completed based on such findings.

Thus, the apparatus of the present invention for producing a microporous plastic film comprises, a pair of laterally arranged vertical columns;

a pair of laterally arranged stationary frames each fixed to each vertical column such that they are positioned inside the vertical columns;

first vertical guide rails each attached to a one-side surface of each of the stationary frames;

a pair of laterally arranged movable frames rotatable under the stationary frames;

a pattern roll having large numbers (pluralities) of high-hardness, fine particles at random on a rolling surface and rotatably supported by the stationary frames at a fixed position;

an anvil roll movable up and down along the first vertical guide rails under the pattern roll;

second vertical guide rails each attached to a one-side surface of each of said movable frames;

a lower backup roll movable up and down along the second vertical guide rails to push the anvil roll from below;

conveying means for passing the plastic film through a gap between the pattern roll and the anvil roll;

a first driving means for rotating a pair of the movable frames; and second driving means each mounted to each of the movable frames to move the lower backup roll up and down;

the pattern roll and the anvil roll being in parallel with each other;

the first and second vertical guide rails being distant from the vertical columns on one side, such that the movable frames and the lower backup roll do not come into contact with the vertical columns when they are rotated; and with the anvil roll elevated by the pressing of the lower backup roll, and the lower backup roll inclined to the anvil roll in a horizontal plane by the operation of the first driving means, the plastic film passing through a gap between the pattern roll and the anvil roll, so that large numbers (pluralities) of fine pores are formed in the plastic film by the high-hardness, fine particles.

A pair of the movable frames are preferably rotated by the first driving means along a pair of laterally arranged, horizontal, circularly curved guide rails.

It is preferable that the movable plates, to which the movable frames are fixed, are fixed to both ends of a horizontal plate connected to the first driving means; and that each of the circularly curved guide rails engages a guide groove on a bottom surface of each of the movable plates.

The apparatus of the present invention for producing a microporous plastic film preferably further comprises a third driving means for simultaneously rotating the pattern roll and the anvil roll; and a fourth driving means for rotating the lower backup roll.

The apparatus of the present invention for producing a microporous plastic film preferably further comprises a sensor disposed downstream of the gap between the pattern roll and the anvil roll for observing the characteristics of fine pores (opening diameters, depths, areal density, etc.) in the resultant microporous plastic film; and a means receiving an output signal of the sensor for generating a signal for adjusting the horizontal inclination angle of the lower backup roll to the anvil roll to obtain desired characteristics of fine pores.

It is preferable that the formation of fine pores in the plastic film is started, in a state where the horizontal inclination angle of the lower backup roll to the anvil roll is 0°, and that the first driving means is then operated according to signals output from the sensor.

It is preferable that the high-hardness, fine particles of the pattern roll have sharp edges and Mohs hardness of 5 or more, and that the area ratio of the high-hardness, fine particles on a rolling surface of the pattern roll is 10-70%.

The apparatus of the present invention for producing a microporous plastic film preferably further comprises an upper backup roll for pressing the pattern roll downward.

BRIEF DESCRIPTION OF THE DRAWINGS

FIG. 2(b) is a front view showing the apparatus of the present invention for producing a microporous plastic film, with rolls closed.

DESCRIPTION OF THE PREFERRED EMBODIMENTS

Figure 1:
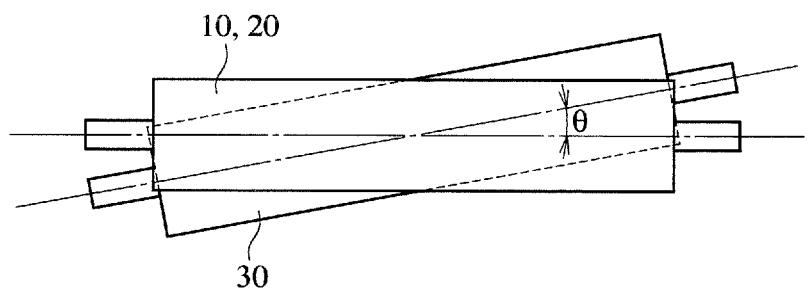
FIG. 1 is a plan view showing a lower backup roll inclined to a pattern roll and an anvil roll.

The embodiments of the present invention will be explained in detail below referring to the attached drawings. Explanations of each embodiment are applicable to other embodiments unless otherwise mentioned. Explanations below are not restrictive, but various modifications may be made within the scope of the present invention.

[1] Structure of Apparatus for Producing Microporous Plastic Film

As shown in FIGS. 2(a), 2(b) and 3-6, the apparatus for producing a microporous plastic film according to an embodiment of the present invention comprises a pair of laterally arranged vertical columns 111, 111 fixed to a base 60;

a pair of laterally arranged stationary frames 40, 40 each fixed to an upper portion of each vertical column 111, 111, such that they are positioned inside the vertical columns 111, 111;

first vertical guide rails 45, 45 each attached to a one-side surface of each of the stationary frames 40, 40;

a pair of laterally arranged movable frames 50, 50 rotatable under the stationary frames 40, 40;

a pattern roll 10 having large numbers (pluralities) of high-hardness, fine particles at random on a rolling surface to form fine pores in a plastic film F, and rotatably supported by the stationary frames 40, 40 at a fixed position;

an anvil roll 20 movable up and down along the first vertical guide rails 45, 45 under the pattern roll 10;

second vertical guide rails 54, 54 each attached to a one-side surface of each of the movable frames 50, 50;

a lower backup roll 30 movable up and down along the second vertical guide rails 54, 54 to push the anvil roll 20 from below;

conveying means (guide roll) 140a, 140b for passing a plastic film F through a gap between the pattern roll 10 and the anvil roll 20;

a first driving means 70 fixed to an upper surface of the base 60 to rotate the movable frames 50, 50;

second driving means 80, 80 each mounted to each of the movable frames 50, 50 to move the lower backup roll 30 up and down;

a third driving means 90 for simultaneously rotating the pattern roll 10 and the anvil roll 20; and a fourth driving means 100 for rotating the lower backup roll 30;

the pattern roll 10 and the anvil roll 20 being in parallel with each other;

the first and second vertical guide rails 45, 45, 54, 54 being distant from the vertical columns 111, 111 on one side, such that the movable frames 50, 50, the lower backup roll 30 and the fourth driving means 100 do not come into contact with the vertical columns when they are rotated; and with the anvil roll 10 elevated by the pressing of the lower backup roll 30, and the lower backup roll 30 inclined to the anvil roll 20 in a horizontal plane by the operation of the first driving means 70, the plastic film F passing through a gap between the pattern roll 10 and the anvil roll 20, so that large numbers (pluralities) of fine pores are formed in the plastic film F by the high-hardness, fine particles of the pattern roll 10.

The apparatus of the present invention for producing a microporous plastic film further comprises a first reel 151 around which a plastic film F is wound; a second reel 152 for winding a formed microporous plastic film Fa; and pluralities of guide rolls and nip rolls for guiding the plastic film F and the microporous plastic film Fa.

(1) Vertical Column

As shown in FIGS. 5(*a*) to 5(*c*), a pair of vertical columns 111, 111 are fixed to a base 60, and each vertical column 111 is provided with at least one planar projection 112 on a one-side surface [front surface (on the upstream side of the flow of a plastic film F) in the depicted example]. Planar brackets 113, 113 are fixed to inside surfaces (opposing surfaces) of the vertical columns 111, 111 and the planar projections 112, 112. With respect to the direction of the plastic film F passing through the gap between the pattern roll 10 and the anvil roll 20, "one-side" is exemplified as "upstream side" for simplicity, with "upstream-side surface" as "front surface," and "downstream-side surface" as "rear surface," in explanations below without intention of restriction. Accordingly, the planar bracket 113 is projecting forward from the upstream-side surface of each vertical column 111.

(2) Stationary Frame

Figure 3:
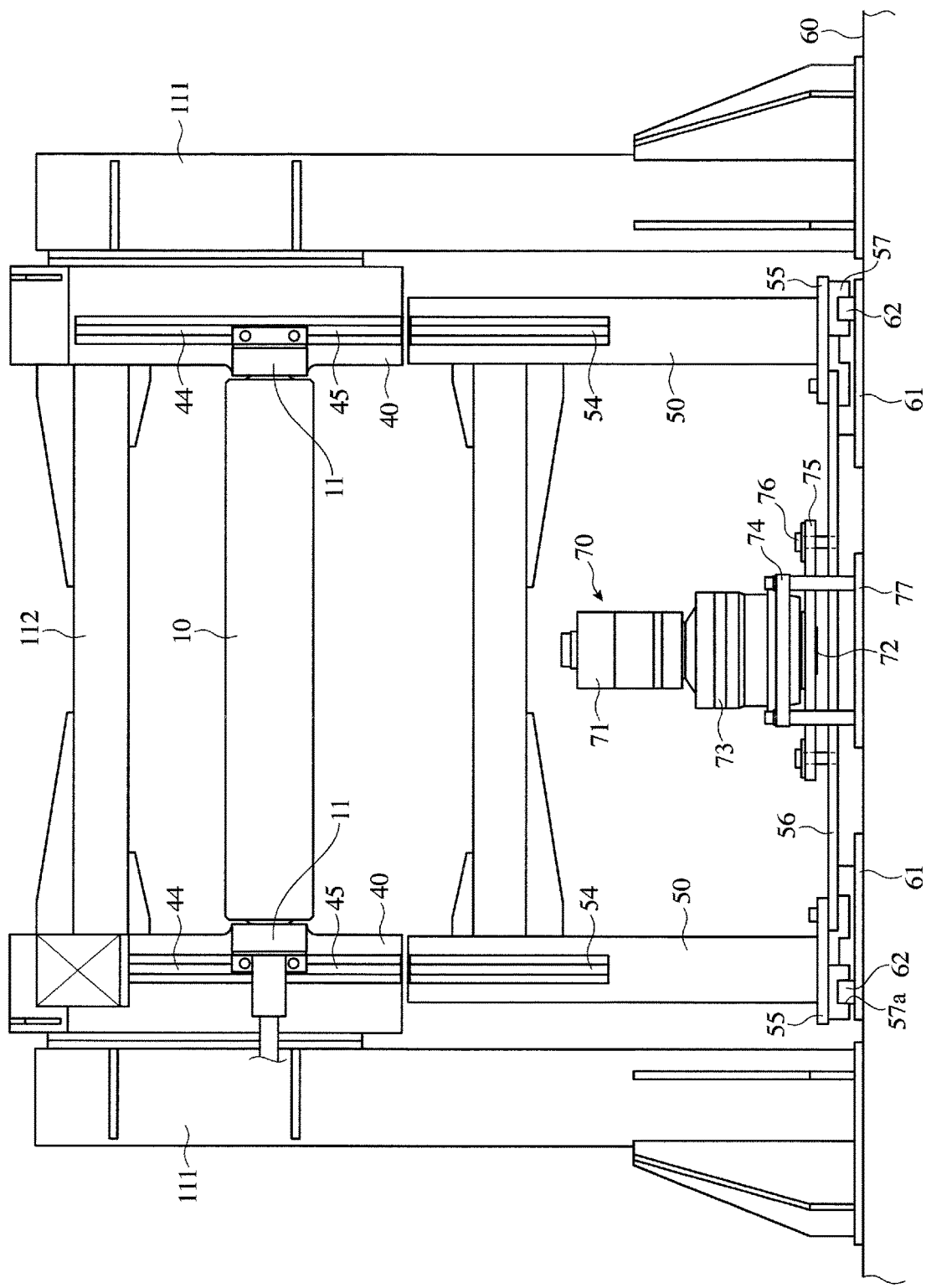
FIG. 3 is a front view showing the frame structure of the apparatus of the present invention for producing a microporous plastic film.
Figure 4:
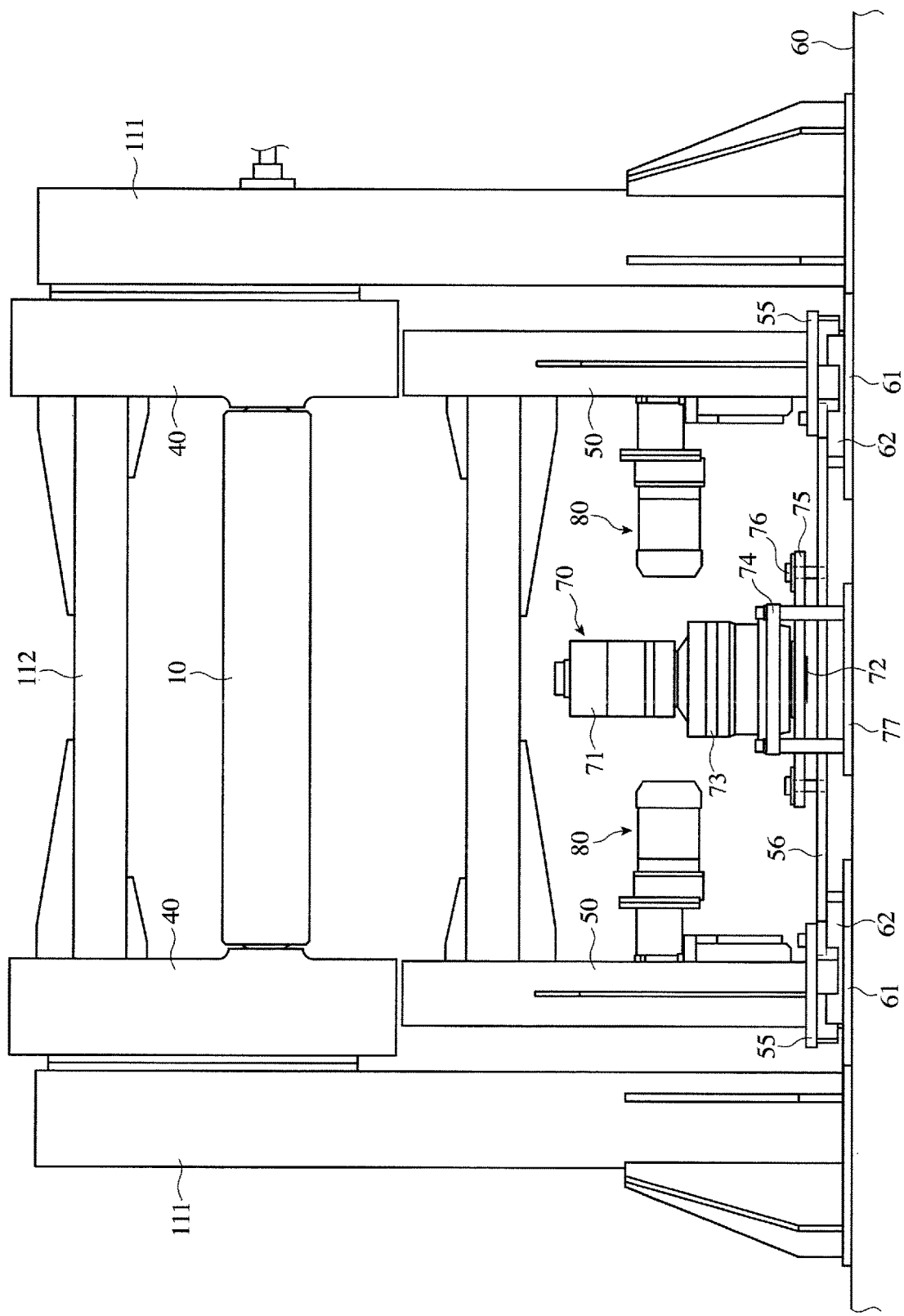
FIG. 4 is a rear view showing the frame structure of the apparatus of the present invention for producing a microporous plastic film.

As shown in FIGS. 3-5, the planar bracket 113 fixed to the inside surface 111*a* of each of the vertical columns 111, 111 is fixed by bolts, etc. to a fixing plate 41 of each stationary frame 40. Because the planar brackets 113, 113 project forward from the upstream-side surfaces of the vertical columns 111, 111, the upstream-side surfaces (front surfaces) of the stationary frames 40, 40 fixed to the planar brackets 113, 113 are positioned forward from the upstream-side surfaces (front surfaces) of the vertical columns 111, 111 by a sufficient distance.

A horizontal beam 120 is fixed to upper portions of a pair of stationary frames 40, 40 to reinforce the stationary frames 40, 40 with their constant distance. As shown in FIG. 3, with each bearing 11 of the pattern roll 10 supported by each stationary frame 40 at a fixed position, the pattern roll 10 rotates at a predetermined position without moving up and down with respect to the stationary frames 40, 40.

An upper vertical guide rail 44 and a lower vertical guide rail (first vertical guide rail) 45 are fixed to a front surface of each stationary frame 40 in vertical alignment above and under the pattern roll 10. Because the front surface of each stationary frame 40 is positioned forward from the front surface of each vertical column 111, both vertical guide rails 44, 45 are also positioned forward from the front surfaces of both vertical columns 111, 111.

(3) Movable Frame

As shown in FIG. 3, each movable frame 50 fixed to an upper surface of each movable plate 55 is positioned under each stationary frame 40. A second vertical guide rail 54 vertically aligned with the first vertical guide rail 45 is fixed to a front surface of each movable frame 50.

As shown in FIGS. 2-4 and 9, a guide block 57 having a guide groove 57*a* slidably engaging each circularly curved guide rail 62 is fixed by bolts to a bottom surface of each movable plate 55. Though each movable plate 55 is provided with a pair of guide blocks 57, 57 in the depicted example, the number of guide blocks 57 is not restricted. Each movable frame 50 is fixed to each movable plate 55, and both movable plates 55, 55 are fixed to both ends of the horizontal plate 56 connected to the first driving means 70.

As shown in FIGS. 2(*a*), 5(*a*) and 8, a pair of laterally arranged flat plates 61, 61 are fixed to an upper surface of the base 60, and the circularly curved guide rail 62 is fixed to each flat plate 61. When the guide blocks 57, 57 of a pair of movable plates 55, 55 move along the circularly curved guide rails 62, 62, the movable plates 55, 55 laterally rotate around a center O of the first driving means 70.

(4) Pattern Roll

Figure 10:
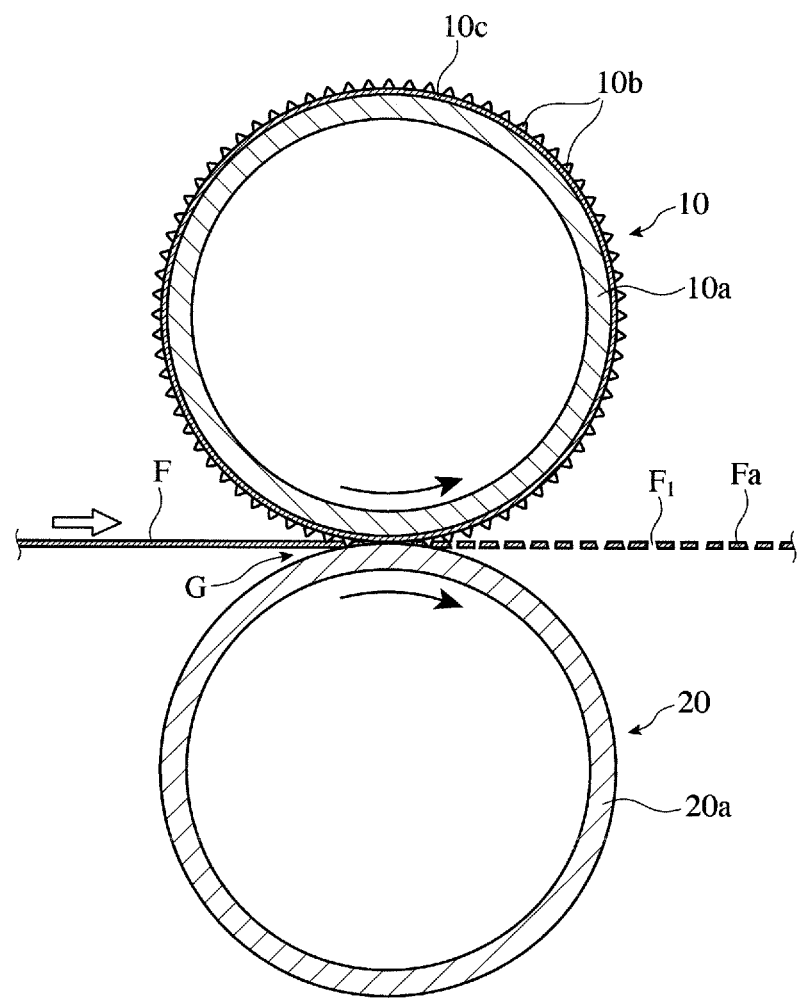
FIG. 10 is a cross-sectional view showing the formation of fine pores in a plastic film by a pattern roll and an anvil roll.

As shown in FIG. 10, the pattern roll 10 preferably comprises large numbers (pluralities) of high-hardness, fine particles 10*b* randomly fixed to a rolling surface of a metal roll body 10*a* by a plating layer 10*c* such as nickel plating, etc. Specific examples of such pattern roll 10 are described in, for example, JP 5-131557 A, JP 9-57860 A, and JP 2002-59487 A.

The high-hardness, fine particles 10*b* preferably have sharp edges (corners), and Mohs hardness of 5 or more. The high-hardness, fine particles 10*b* are preferably fine diamond particles, particularly pulverized fine diamond particles.

The high-hardness, fine particles 10*b* preferably have a particle size distribution in a range of 10-500 μm, depending on the characteristics (opening diameters, depths, areal density, etc.) of fine pores formed. When the particle sizes of the high-hardness, fine particles 10*b* are less than 10 μm, fine pores are not formed sufficiently in the plastic film F. On the other hand, when the particle sizes of the high-hardness, fine particles 10*b* are more than 500 μm, too large fine pores are formed in the plastic film F. The lower limit of the particle sizes of the high-hardness, fine particles 10*b* is more preferably 20 μm, most preferably 30 μm. The upper limit of the particle sizes of the high-hardness, fine particles 10*b* is more preferably 400 μm, most preferably 300 μm.

Because the high-hardness, fine particles 10*b* attached to a rolling surface of the pattern roll 10 have different particle size distributions, depending on (i) the material and thickness of the plastic film F used, and (ii) the opening diameters, depths, areal density, etc. of fine pores formed, the particle size distribution of the high-hardness, fine particles 10*b* is preferably selected within the above range.

The high-hardness, fine particles 10*b* preferably have aspect ratios of 3 or less. With the aspect ratios of 3 or less, the high-hardness, fine particles 10*b* have polygonal shapes close to spheres. The aspect ratios of the high-hardness, fine particles 10*b* are more preferably 2 or less, most preferably 1.5 or less.

With about ½ to about ⅔ of the high-hardness, fine particles 10*b* embedded in the plating layer 10*c*, the height distribution of the high-hardness, fine particles 10*b* projecting from a surface of the plating layer 10*c* is preferably in a range of 10-400 μm. When the projecting height of the high-hardness, fine particles 10*b* is less than 10 μm, sufficient fine pores are not formed. On the other hand, when the projecting height of the high-hardness, fine particles 10*b* is more than 400 μm, too large fine pores are formed in the plastic film F. The lower limit of the projecting height distribution of the high-hardness, fine particles 10*b* is more preferably 20 μm, most preferably 30 μm. The upper limit of the projecting height distribution of the high-hardness, fine particles 10*b* is more preferably 300 μm, most preferably 200 μm.

The area ratio of the high-hardness, fine particles 10*b* on a rolling surface of the pattern roll 10 (a surface percentage of the pattern roll 10 occupied by the high-hardness, fine particles 10b) is preferably 10-70%. When the area ratio of the high-hardness, fine particles 10b is less than 10%, fine pores cannot be formed at a sufficient density in the plastic film F. On the other hand, the fixing of the high-hardness, fine particles 10b to the rolling surface of the pattern roll 10 at an area ratio of more than 70% is practically difficult. The area ratio of the high-hardness, fine particles 10b is more preferably 20% in lower limit, and 60% in upper limit.

To prevent the pattern roll 10 from being bent while forming fine pores in the plastic film F, a roll body 10a of the pattern roll 10 is preferably made of a hard metal. The hard metal may be die steel such as SKD11.

The plastic film F can be provided with penetrating fine pores and/or unpenetrating fine pores. When only unpenetrating fine pores are forming in the plastic film F, the high-hardness, fine particles 10b projecting from a surface (rolling surface) of the plating layer 10c should have such average height and maximum height as to form unpenetrating fine pores having an average depth Dav corresponding to 30-80% of the thickness of the plastic film F and the maximum depth Dmax corresponding to 90% or less in the plastic film F. The average height of high-hardness, fine particles 10b projecting from the rolling surface is preferably 30-80%, more preferably 35-70%, most preferably 40-60%, of the thickness of the plastic film F. The maximum height of high-hardness, fine particles 10b projecting from the rolling surface is preferably 90% or less, more preferably 85% or less, most preferably 80% or less, of the thickness of the plastic film F. The average particle size of high-hardness, fine particles 10b on the rolling surface of the pattern roll 10 is preferably 20-100 µm, more preferably 25-80 µm, most preferably 30-60 µm.

(5) Anvil Roll

In order that the anvil roll 20 to be combined with the pattern roll 10 enables the high-hardness, fine particles 10b of the pattern roll 10 to sufficiently intrude a plastic film F, while exhibiting sufficient deformation resistance to a perforating load, the anvil roll 20 is preferably made of a high-strength, hard metal, particularly a high-strength, corrosion-resistant stainless steel (SUS440C, SUS304, etc.). Also, the anvil roll 20 may have a two-layer structure comprising an inner layer of a hard metal such as die steel, and an outer layer of high-strength, corrosion-resistant stainless steel such as SUS304. The thickness of the outer layer may be practically about 20-60 mm.

Figure 5A:
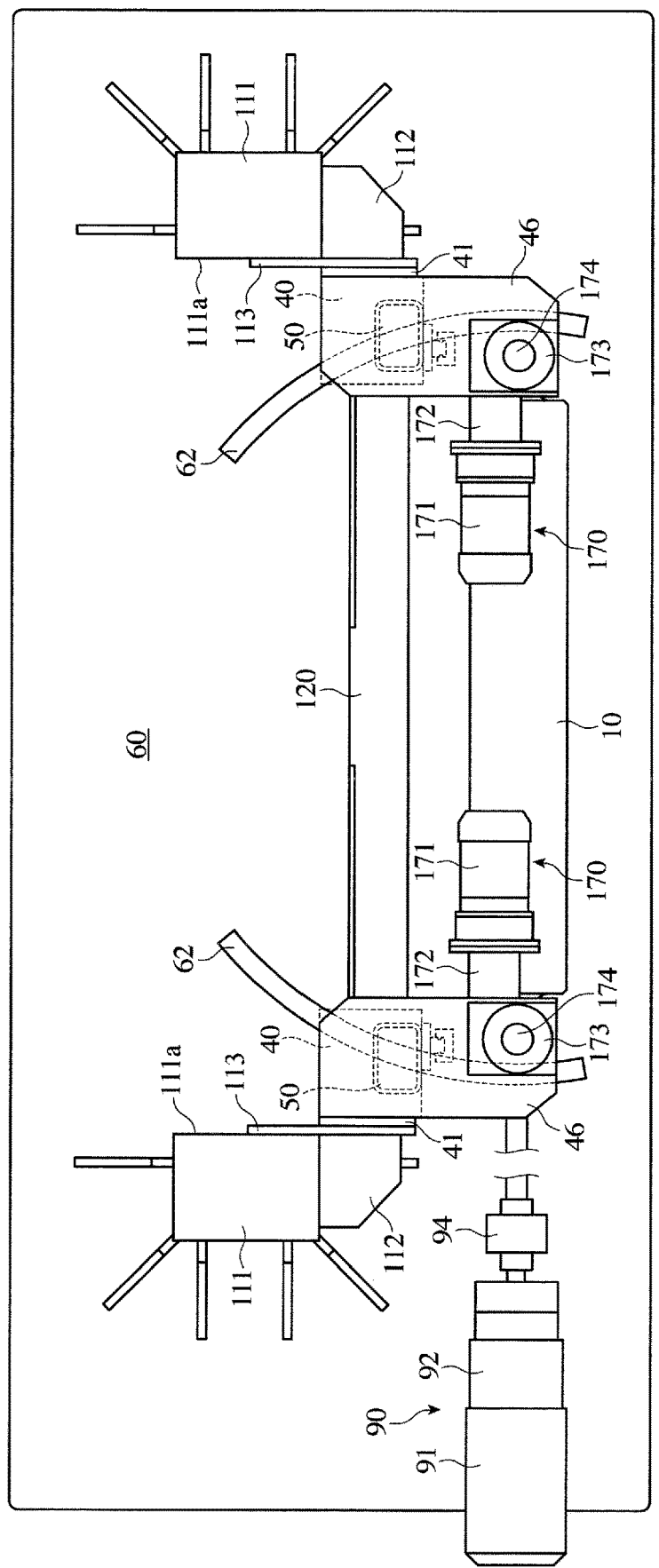
FIG. 5(a) is a partially omitted plan view showing the frame structure of the apparatus of the present invention for producing a microporous plastic film.
Figure 5B:
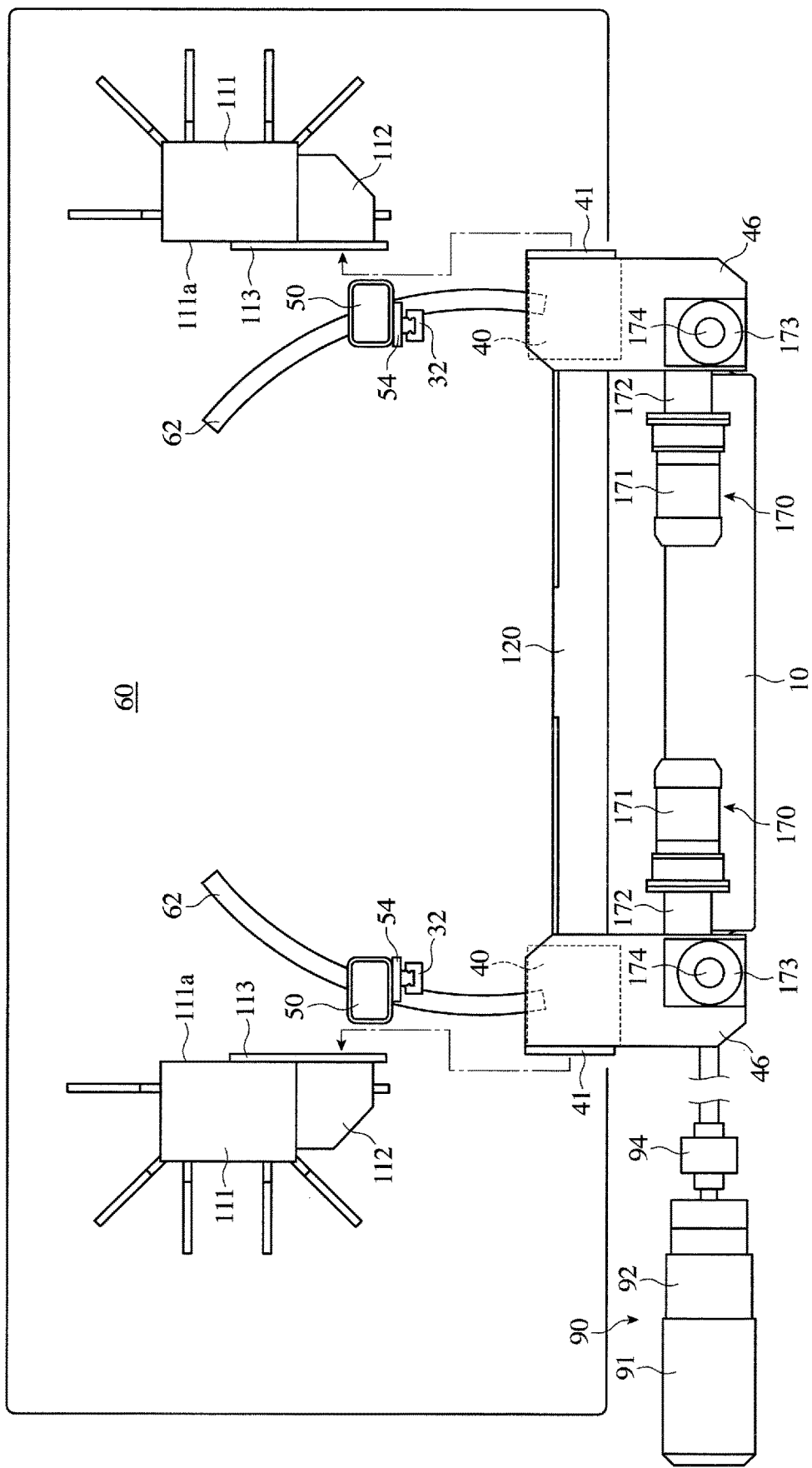
FIG. 5(b) is a partially omitted, exploded plan view showing the frame structure of the apparatus of the present invention for producing a microporous plastic film.
Figure 5C:
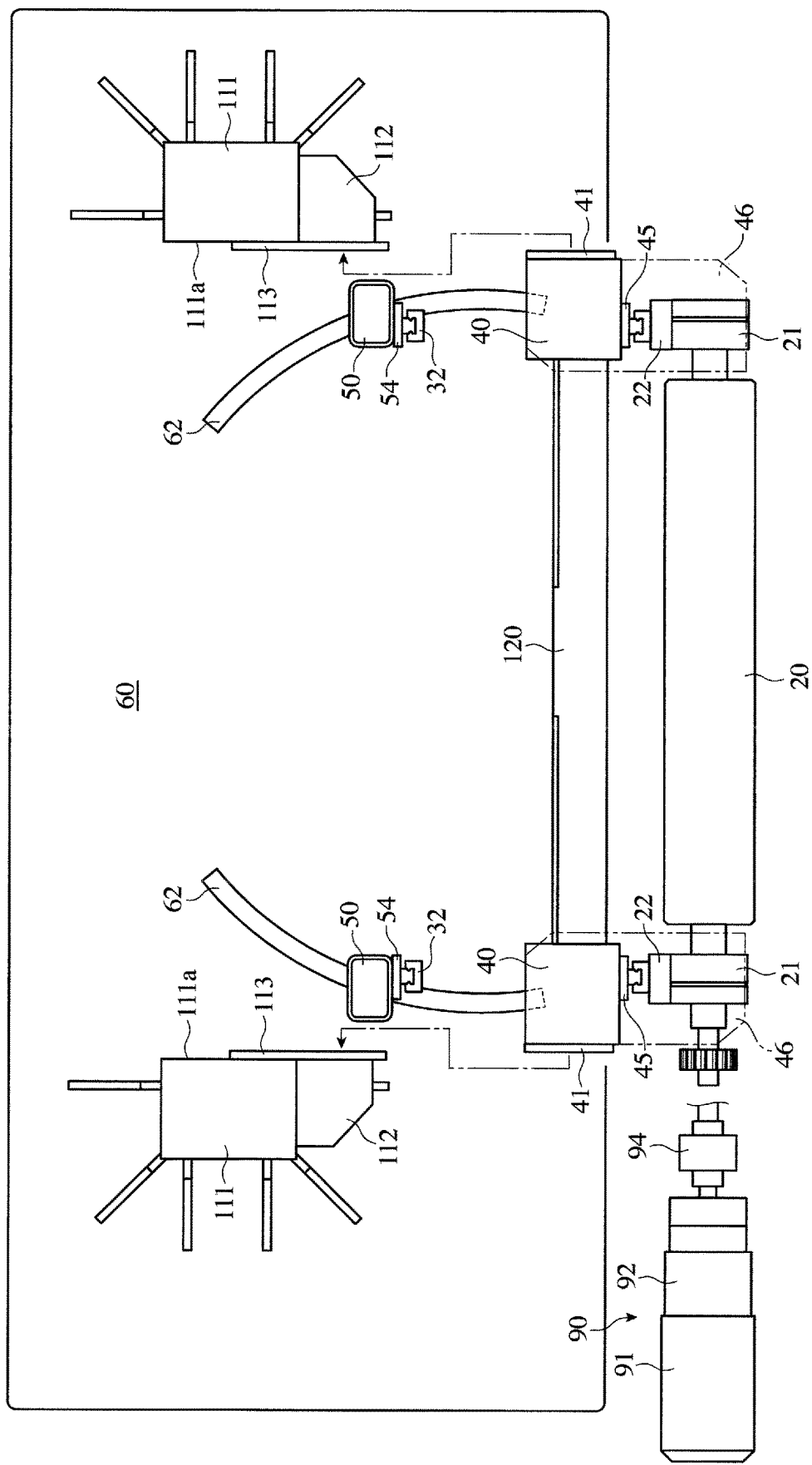
FIG. 5(c) is a plan view showing the arrangement of an anvil roll in the apparatus of the present invention for producing a microporous plastic film.
Figure 6:
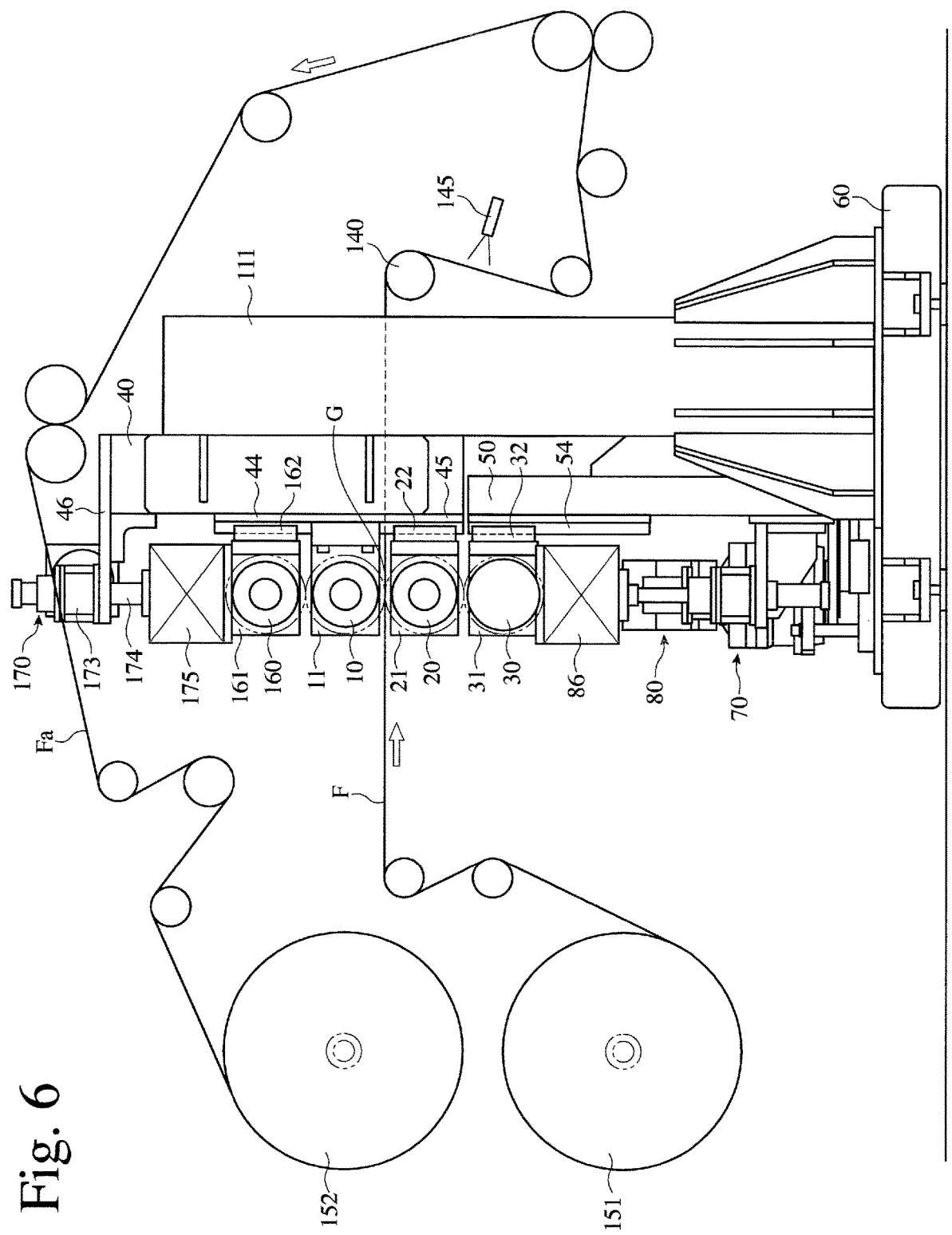
FIG. 6 is a right side view showing the apparatus of the present invention for producing a microporous plastic film.

As shown in FIGS. 5(c) and 6, a guide member 22 engaging the first (lower) vertical guide rail 45 of each stationary frame 40 is fixed to a rear surface of each bearing 21 of the anvil roll 20. As described below, the anvil roll 20 can move up and down along the first vertical guide rails 45, 45, by the vertical movement of the lower backup roll 30.

(6) Lower Backup Roll

Figure 2A:
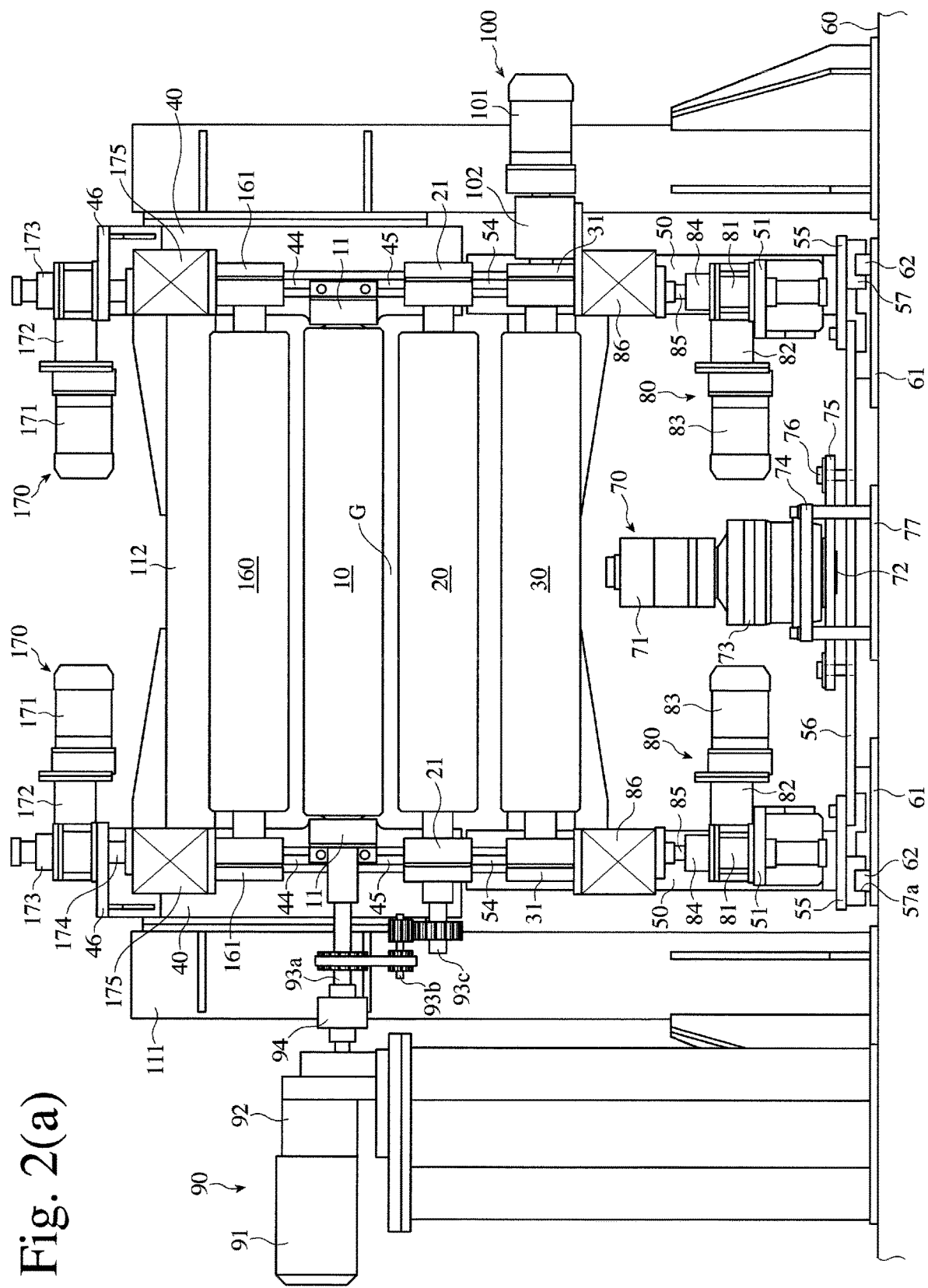
FIG. 2(a) is a front view showing the apparatus of the present invention for producing a microporous plastic film, with rolls opened.

Because guide members 32, 32 fixed to rear surfaces of a pair of bearings 31, 31 of the lower backup roll 30 engage the second vertical guide rails 54, 54 fixed to front surfaces of the movable frames 50, 50 as shown in FIGS. 2(a), 3 and 5(c), the lower backup roll 30 is movable up and down along the second vertical guide rails 54, 54 of the movable frames 50, 50. Because the lower backup roll 30 is positioned just under the anvil roll 20, the anvil roll 20 is pressed to the pattern roll 10 from below when the lower backup roll 30 is elevated.

(7) First Driving Means

Figure 7:
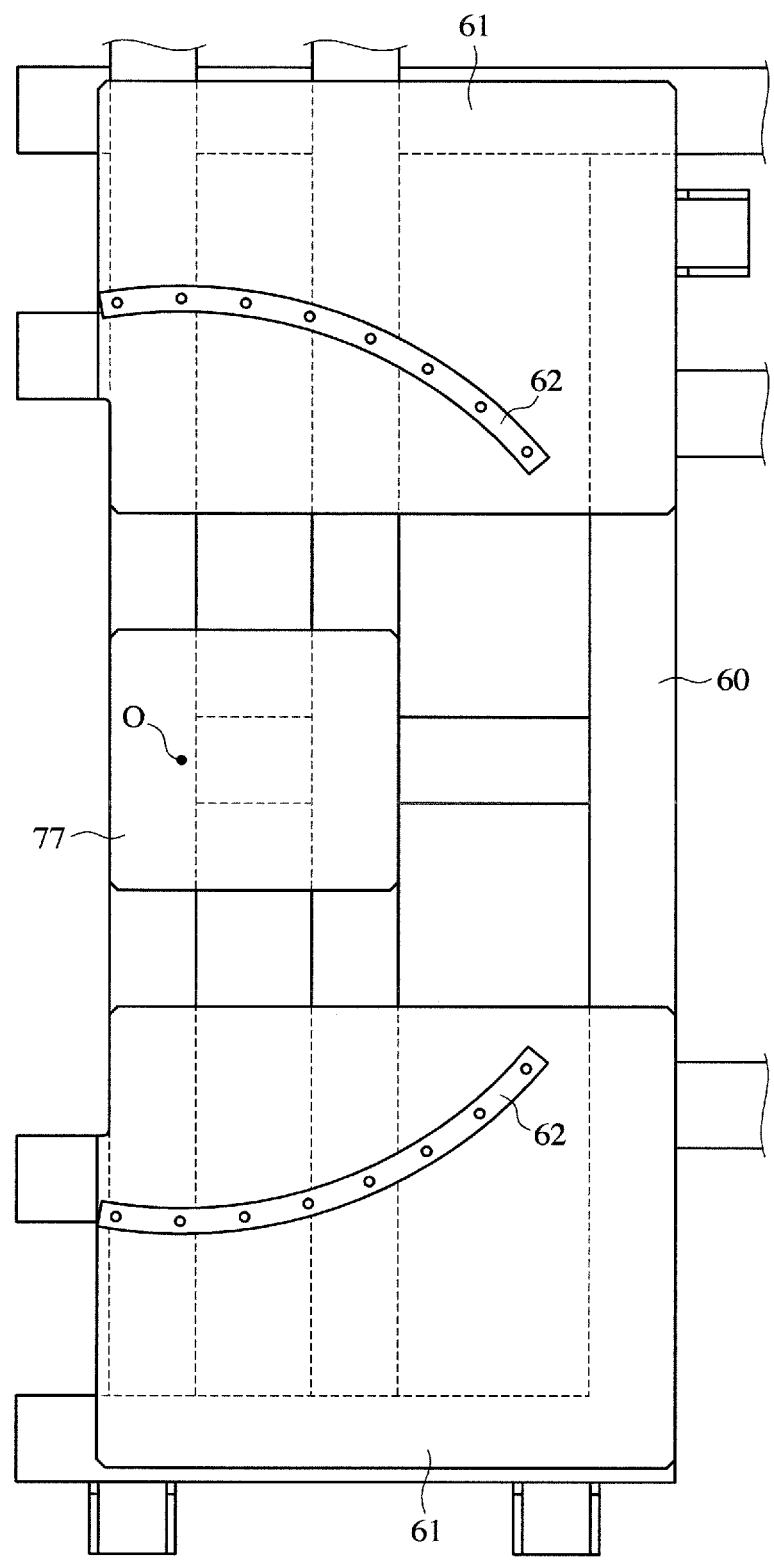
FIG. 7 is a plan view showing circularly curved guide rails fixed to a base.
Figure 8:
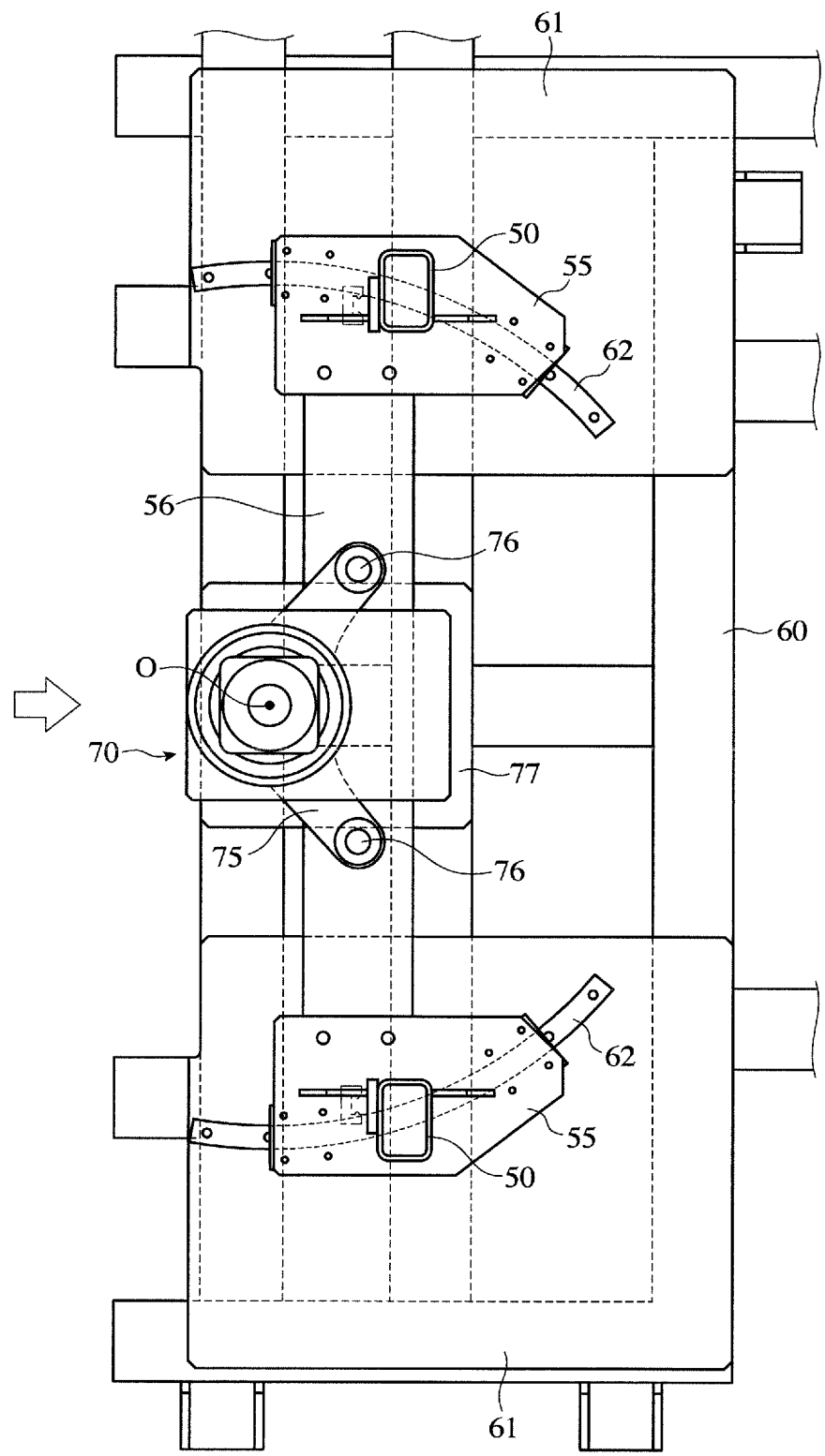
FIG. 8 is a partially omitted plan view showing the relation between circularly curved guide rails and a pair of laterally arranged movable frames.
Figure 9:
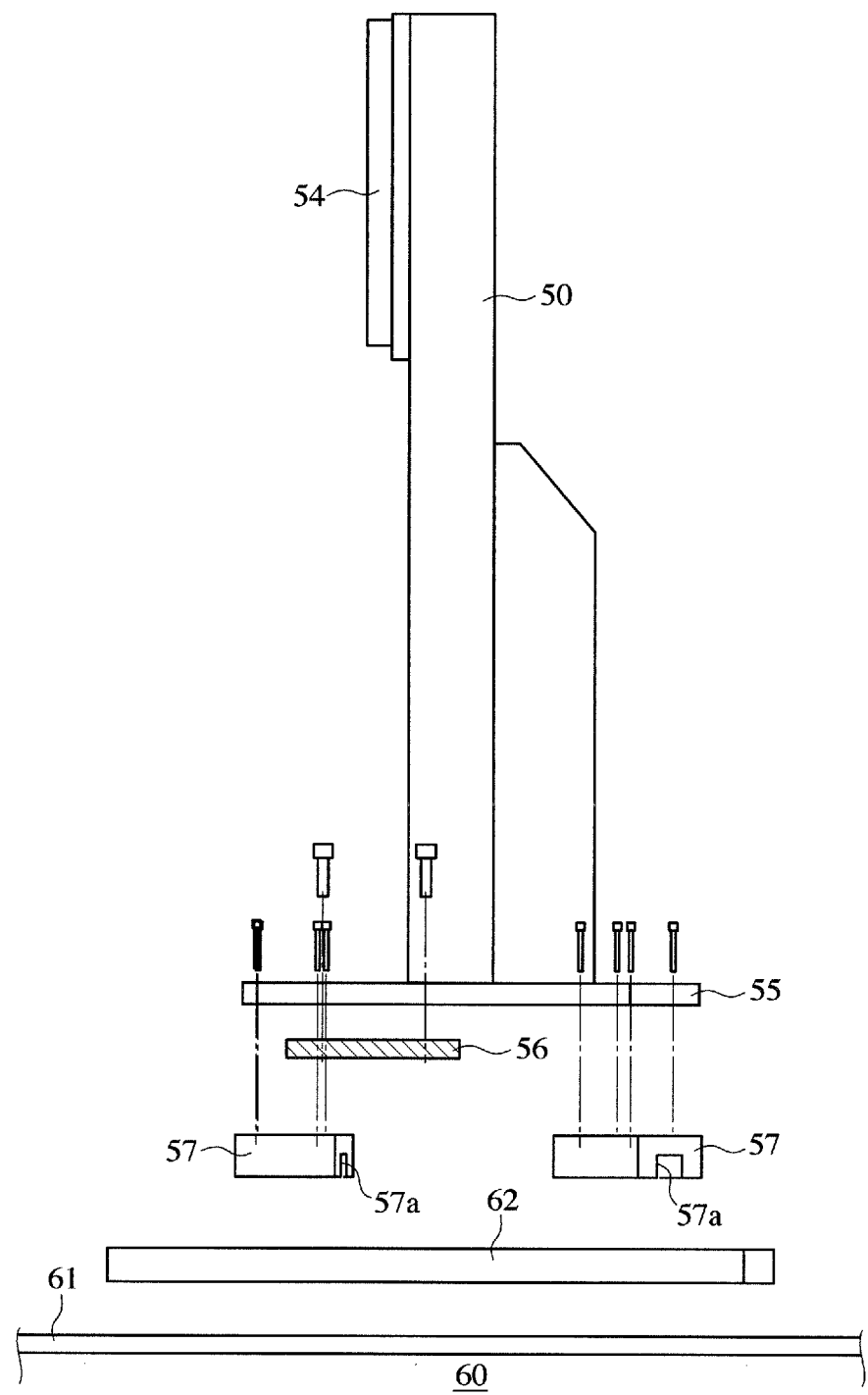
FIG. 9 is an exploded side view showing the structure of a movable frame movable along the circularly curved guide rail.

The first driving means 70 connected to the horizontal plate 56 comprises a motor 71, a reduction gear 73 connected to a shaft 72 of the motor 71, a frame 74 supporting the reduction gear 73, and a connector plate 75 fixed to the shaft 72. The frame 74 is fixed to a flat plate 77 on the base 60. The connector plate 75 is fixed to the horizontal plate 56 by bolts 76. As shown in FIG. 7, the frame 74 supporting the first driving means 70 is fixed to the flat plate 77 in a center portion of the base 60.

(8) Second Driving Means

Each second driving means 80 is fixed to a bracket 51 of each movable frame 50. Each second driving means 80 comprises a gear box 81 supported by the bracket 51 fixed to the movable frame 50, a motor 83 connected to the gear box 81 via a reduction gear 82, a screw jack 84 attached to the gear box 81, and a mail screw member 85 projecting from the screw jack 84. Each bearing 31 of the lower backup roll 30 is supported by the mail screw member 85 of the screw jack 84 via a buffer 86. The buffer 86 comprises a resilient member such as a coil spring, and a load sensor, to prevent the bearing 31 of the lower backup roll 30 from receiving excessive shock. As shown in FIG. 6, with the guide members 32, 32 slidably engaging the second vertical guide rails 44, 44 of the movable frames 50, 50, the bearings 31, 31 of the lower backup roll 30 moves up and down along the second vertical guide rails 54, 54 of the movable frames 50, 50, by the operation of the second driving means 80.

(9) Third Driving Means

As shown in FIGS. 2(a) and 2(b), the third driving means 90 for rotating the pattern roll 10 and the anvil roll 20 simultaneously comprises a motor 91, a reduction gear 92 connected to the motor 91, and a coupling device 94 connected to a first rotation shaft 93a of the reduction gear 92. The first rotation shaft 93a is connected to one bearing 11 of the pattern roll 10.

Figure 11A:
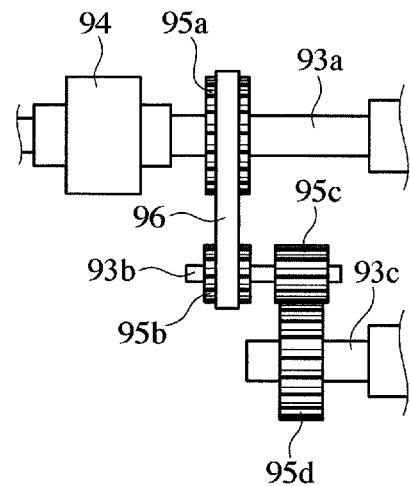
FIG. 11(a) is an enlarged front view showing gears in a third driving means.
Figure 11B:
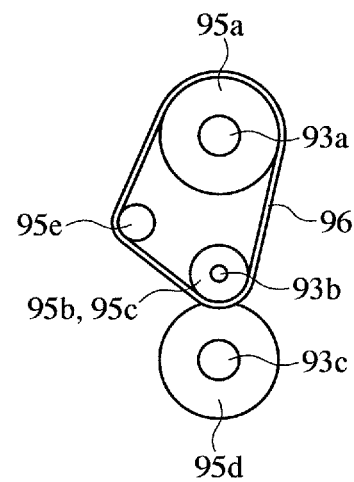
FIG. 11(b) is an enlarged side view showing gears in a third driving means.

As shown in FIG. 11(a), a first gear 95a fixed to the first rotation shaft 93a engages a second gear 95b fixed to a second rotation shaft 93b via a chain 96, and a third gear 95c fixed to the second rotation shaft 93b engages a fourth gear 95d fixed to a third rotation shaft 93c connected to one bearing 21 of the anvil roll 20. Accordingly, the first gear 95a and the fourth gear 95d rotate in opposite directions. As shown in FIG. 11(b), because the chain 96 engages a fifth gear 95e, which is always pressed by a spring (not shown) to draw the chain 96, the chain 96 is not slacken even when the distance between the first rotation shaft 93a and the second rotation shaft 93b changes depending on the gap between the pattern roll 10 and the anvil roll 20, so that the power of the motor 91 can be transmitted to both of the pattern roll 10 and the anvil roll 20.

Because the first gear 95a and the fourth gear 95d have the same number of teeth, and because the second gear 95b and the third gear 95c have the same number of teeth, the pattern roll 10 connected to the first gear 95a and the anvil roll 20 connected to the fourth gear 95d rotate at the same rotation speed in opposite directions.

(10) Fourth Driving Means

As shown in FIGS. 2(a) and 2(b), the fourth driving means 100 for rotating the lower backup roll 30 comprises a motor 101 and a reduction gear 102, whose rotation shaft is fixed to one bearing 31 of the lower backup roll 30. Because the lower backup roll 30 is driven independently from the pattern roll 10 and the anvil roll 20, it is easy to horizontally rotate the movable frames 50, 50 supporting the lower backup roll 30 movably up and down.

(11) Sensor

A sensor 145 is preferably disposed downstream of the gap G between the pattern roll 10 and the anvil roll 20, to observe the characteristics (opening diameters, depths, areal density, etc.) of fine pores in a microporous plastic film Fa exiting from the gap G. The apparatus of the present invention also comprises a controller (not shown), to which an output signal of the sensor 145 is input. According to the output signal of the sensor 145, the controller generates a signal for adjusting the gap G between the pattern roll 10 and the anvil roll 20, and a signal for adjusting the horizontal inclination angle θ of the lower backup roll 30 to the anvil roll 20, to obtain a desired characteristics of fine pores.

(12) Upper Backup Roll

As shown in FIGS. 2(a) and 2(b), the apparatus of the present invention may comprise a upper backup roll 160 above the pattern roll 10, to reduce the bending of the pattern roll 10 when forming fine pores. The backup roll 160 coming into contact with the pattern roll 10 is preferably a roll having a relatively elastic rolling surface, such as a rubber roll, etc. As shown in FIG. 6, with a guide member 162 fixed to a rear surface of each bearing 161 of the backup roll 160, and with each guide member 162 engaging the upper vertical guide rail 44 of each stationary frame 40, the backup roll 160 is movable up and down along the upper vertical guide rails 44, 44.

Both bearings 161, 161 of the backup roll 160 are driven by a pair of fifth driving means 170, 170 fixed to the brackets 46, 46 of a pair of the stationary frames 40, 40. Each fifth driving means 170 comprises a motor 171, a reduction gear 172 connected to the motor 171, a screw jack 173 mounted to a bracket 46 of the stationary frame 40 and connected to the reduction gear 172, a mail screw member 174 projecting from the screw jack 173, and a buffer 175 mounted to a lower end of the mail screw member 174. The buffer 175 comprises a resilient member such as a coil spring, and a load sensor, to prevent excessive shock from being applied to the bearing 161 of the backup roll 160.

As shown in FIGS. 2(a) and 2(b), when the mail screw members 174, 174 of the screw jacks 173, 173 are lowered by the operation of the motors 171, 171, the bearings 161, 161 of the backup roll 160 are pushed downward via the buffers 175, 175. As a result, the backup roll 160 pushes the pattern roll 10 downward to reduce the bending of the pattern roll 10 during forming pores. With the bending of the pattern roll 10 reduced, a relative inclination angle θ between the anvil roll 20 and the lower backup roll 30 can be made smaller, shortening a time period necessary for adjusting the inclination angle θ.

[2] Production of Microporous Plastic Film (1) Plastic Film

A plastic film F, in which fine pores are formed by the apparatus of the present invention, should have softness enabling the formation of fine pores by the high-hardness, fine particles 10b of the pattern roll 10, and such high strength and hardness as to avoid troubles such as rupture, etc. when forming fine pores. Such plastics are preferably flexible thermoplastic polymers, which include polyesters such as polyethylene terephthalate (PET), polybutylene terephthalate (PBT), etc.; polyolefins such as oriented polypropylene (OPP), etc.; polyamides such as nylons (Ny), etc.; polyvinyl chloride; polyvinylidene chloride; polystyrenes; etc.

The plastic film F, in which penetrating or unpenetrating fine pores are formed, preferably has thickness in a range of 8-100 μm. When the thickness of the plastic film F is less than 8 μm, it does not have sufficient strength when fine pores are formed. On the other hand, when the thickness of the plastic film F is more than 100 μm, it is too hard for a wrapping film. The thickness of the plastic film F is more preferably 10-80 μm, most preferably 12-60 μm.

The plastic film F may be a single-layer film or a laminate film. Particularly when heat sealing is conducted, the plastic film F is preferably a laminate film having a sealant layer of a low-melting-point resin such as LLDPE and EVAc as an inner layer. The sealant layer may be as thick as about 20-60 μm. When only unpenetrating pores are formed, the sealant layer may be laminated after unpenetrating pores are formed in the plastic film F.

(2) Forming Pores in Plastic Film

When the lower backup roll 30 at a downward position is in parallel with the anvil roll 20 (the horizontal inclination angle θ of the lower backup roll 30 to the anvil roll 20 is 0°), a plastic film F is unwound from the first reel 151, passes through a large gap G between the pattern roll 10 and the anvil roll 20, the guide roll 140, and pluralities of guide rolls and nip rolls, and is wound up by the second reel 152, while operating the third driving means 90 to rotate the pattern roll 10 and the anvil roll 20.

When the second driving means 80, 80 are operated, the lower backup roll 30 is moved upward to push the anvil roll 20 upward. The plastic film F gradually comes into contact with the pattern roll 10 and the anvil roll 20 in the gap G, thereby being pressed by them.

Figure 12A:
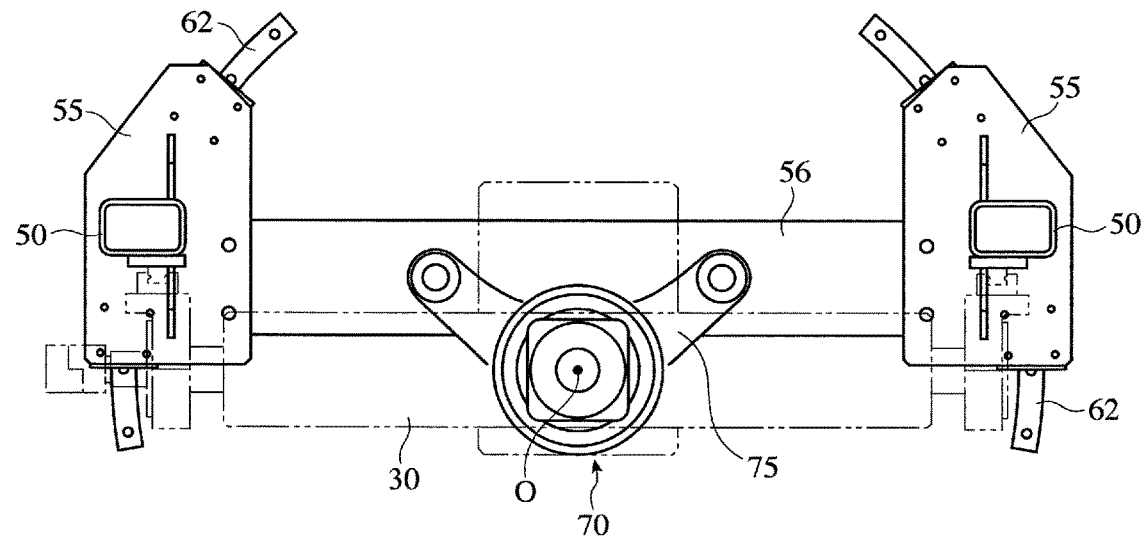
FIG. 12(a) is a plan view showing the relation between a pair of laterally arranged movable frames and a pair of circularly curved guide rails when the lower backup roll is in parallel with the anvil roll.
Figure 12B:
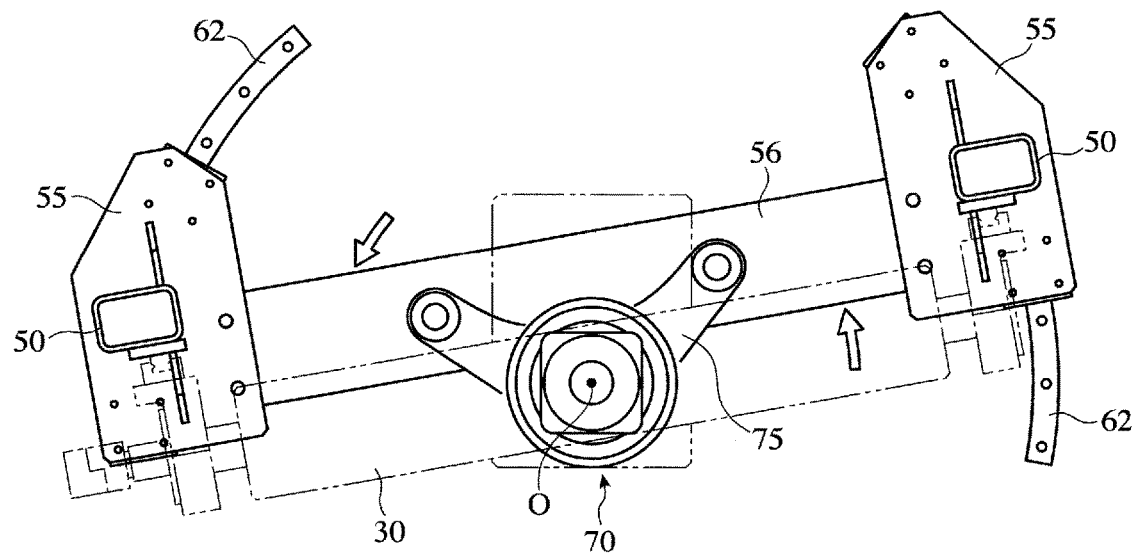
FIG. 12(b) is a plan view showing the relation between a pair of laterally arranged movable frames and a pair of circularly curved guide rails when the lower backup roll is counterclockwise inclined to the anvil roll in a horizontal plane.
Figure 12C:
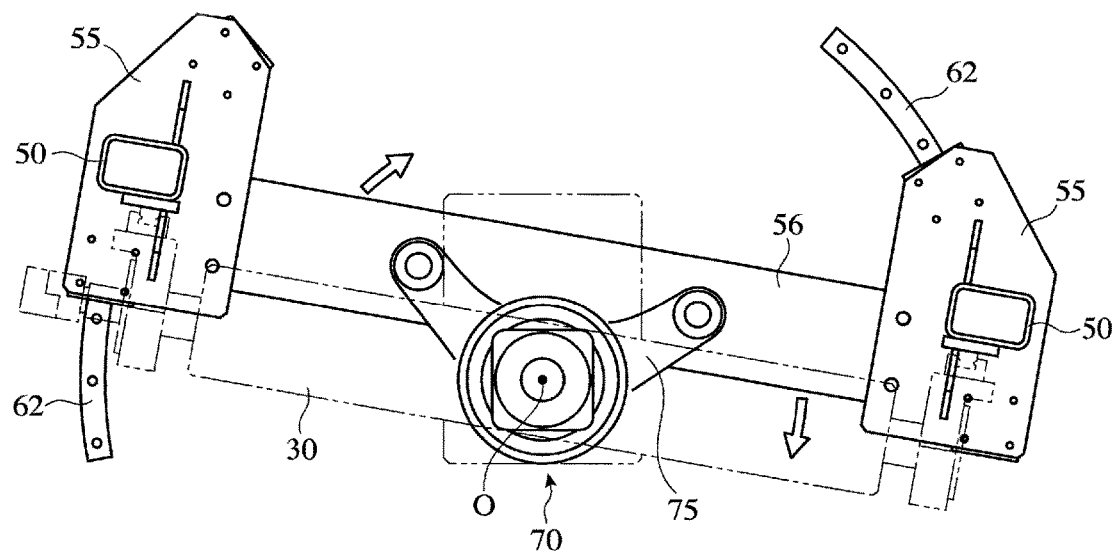
FIG. 12(c) is a plan view showing the relation between a pair of laterally arranged movable frames and a pair of circularly curved guide rails when the lower backup roll is clockwise inclined to the anvil roll in a horizontal plane.
Figure 13:
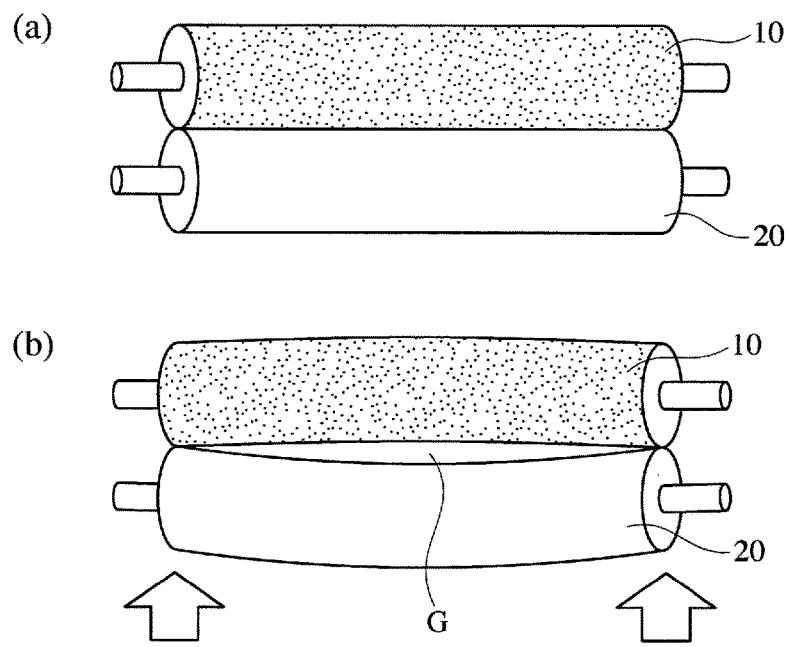
FIG. 13 is a schematic cross-sectional view exaggeratingly showing the bending of a pattern roll and an anvil roll arranged in parallel when fine pores are formed in a plastic film.
Figure 14:
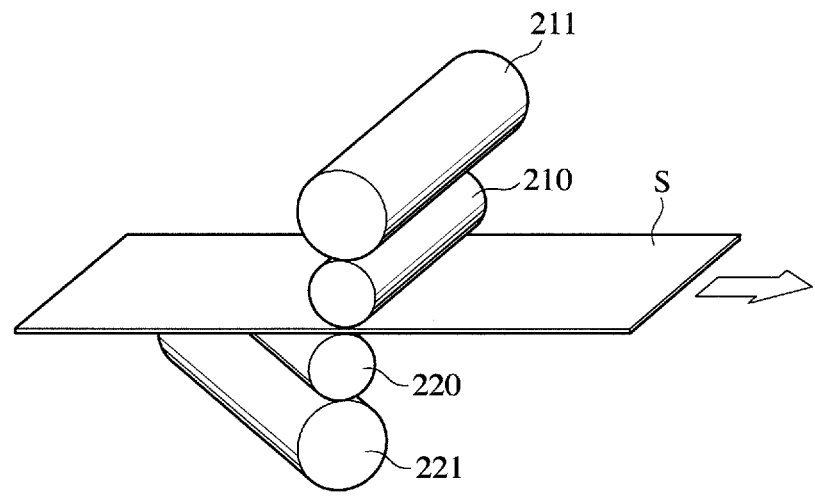
FIG. 14 is a perspective view showing backup rolls added to a pattern roll and an anvil roll mutually inclined to each other to roll a steel sheet.
Figure 15:
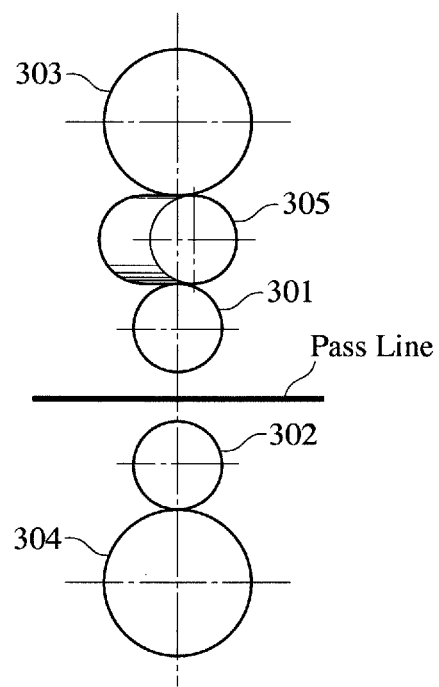
FIG. 15 is a schematic cross-sectional view showing a rolling mill described in U.S. Pat. No. 5,839,313.

When the first driving means 70 is operated (rotated) around the center axis O, a pair of movable plates 55, 55 connected to the horizontal plate 56 are laterally rotated along the circularly curved guide rails 62, 62, so that the lower backup roll 30, whose bearings 31, 31 are supported movably up and down by the movable frames 50, 50 supported by the movable plates 55, 55, is inclined in a horizontal plane from a state parallel to the anvil roll 20 [FIG. 12(a)], counterclockwise [FIG. 12(b)], or clockwise [FIG. 12(c)]. As the clockwise or counterclockwise horizontal inclination angle θ of the lower backup roll 30 to the anvil roll 20 increases, a pressing force of the lower backup roll 30 to a center portion of the anvil roll 20 increases. As a result, the bending of the anvil roll 20 is reduced, so that stress applied to the plastic film F passing through the gap G between the pattern roll 10 and the anvil roll 20 is made laterally uniform.

When the movable frames 50, 50 are horizontally rotated, the lower backup roll 30 and the fourth driving means 100 connected to the lower backup roll 30 are also horizontally rotated. However, because the first and second vertical guide rails 45, 45, 54, 54 are separate from the front surfaces of the vertical columns 111, 111 on the upstream side (forward) as shown in FIGS. 5(a) to 5(c), the horizontal movement of the movable frames 50, 50, the lower backup roll 30 and the fourth driving means 100 are not hindered by the vertical columns 111, 111. Namely, horizontally rotating movable frames 50, 50, lower backup roll 30 and fourth driving means 100 do not come into contact with the vertical columns 111, 111 at all. Therefore, the apparatus of the present invention can have a small structure in which the stationary frames 40, 40 are supported by only a pair of laterally arranged vertical columns 111, 111. This is achieved by employing a so-called "cantilevered" support structure in which the anvil roll 20 and the lower backup roll 30 are supported by the first vertical guide rails 45, 45 on the front surfaces of the stationary frames 40, 40 and the second vertical guide rails 54, 54 on the front surfaces of the movable frames 50, 50, utilizing the characteristics that a force applied to the pattern roll 10 and the anvil roll 20 to form large numbers (pluralities) of fine pores in a plastic film F is much smaller than a force necessary for rolling a thin metal strip as in U.S. Pat. No. 5,839,313.

As shown in FIGS. 6 and 10, the characteristics (opening diameters, depths, areal density, etc.) of fine pores $F_1$ in the microporous plastic film Fa exiting from the gap G are observed by the sensor 145, whose signal is output to a controller (not shown), which forms a first signal for adjusting (optimizing) the gap between the pattern roll 10 and the anvil roll 20, and a second signal for adjusting (optimizing) the horizontal inclination angle θ of the lower backup roll 30 to the anvil roll 20, thereby obtaining a desired characteristics of fine pores. In this state, the plastic film F is perforated to faun a desired microporous plastic film Fa, which is finally wound around the second reel 152.

[3] Microporous Plastic Film (1) Microporous Plastic Film Having Penetrating Pores A microporous plastic film having penetrating pores, which is produced by the apparatus of the present invention, can have moisture permeability of 100-7000 g/m²·24 hr at 40° C. and 90% RH, by adjusting a pressing force by the pattern roll 10 and the anvil roll 20, and their relative inclination angle θ. The moisture permeability is measured by "Testing Methods for Determination of Water Vapor Transmission Rate of Moisture-Proof Packaging Materials" of JIS Z 0208. When the moisture permeability is less than 100 g/m²·24 hr at 40° C. and 90% RH, the microporous plastic film does not have necessary moisture permeability for foods such as breads, vegetables, etc. On the other hand, when the moisture permeability is more than 7000 g/m²·24 hr at 40° C. and 90% RH, the microporous plastic film has too high moisture permeability. The moisture permeability of the microporous plastic film is preferably 200-6000 g/m²·24 hr at 40° C. and 90% RH, more preferably 300-6000 g/m²·24 hr at 40° C. and 90% RH. The moisture permeability of the microporous plastic film may be properly selected within the above range depending on contents to be wrapped.

(2) Microporous Plastic Film Having Only Unpenetrating Pores

In a microporous plastic film having only unpenetrating pores, which is produced by the apparatus of the present invention, the unpenetrating pores preferably have an average depth Dav corresponding to 30-80% of the thickness of the plastic film F, and the maximum depth Dmax corresponding to 90% or less of the thickness of the plastic film F. The unpenetrating fine pores preferably have an average pore diameter Pav of 20-100 µm, and a distribution density Ds of 500-40,000/cm².

Because unpenetrating fine pores are formed by large numbers (pluralities) of high-hardness, fine particles having various sizes and heights randomly attached to a pattern roll surface as described later, they have various sizes and depths. However, to enable easy tearing from any arbitrary position while completely preventing the permeation of oxygen, moisture, etc., the unpenetrating fine pores should have an average depth Dav corresponding to 30-80% of the thickness of the plastic film F, and the maximum depth Dmax corresponding to 90% or less of the thickness of the plastic film F.

When the average depth Dav of unpenetrating fine pores is less than 30% of the thickness of the plastic film F, the microporous plastic film does not have sufficient easiness to tear. On the other hand, When the average depth Dav is more than 80%, all fine pores formed cannot be unpenetrating pores. The average depth Dav of unpenetrating fine pores is preferably 35-70%, more preferably 40-60%, of the thickness of the plastic film F.

When the maximum depth Dmax of unpenetrating fine pores is more than 90%, all fine pores formed cannot be unpenetrating pores. The maximum depth Dmax of the unpenetrating fine pores is preferably 85% or less, more preferably 80% or less, of the thickness of the plastic film F.

When the average pore diameter Pav of unpenetrating fine pores is less than 20 µm, the microporous plastic film does not have sufficient easiness to tear. On the other hand, when the average pore diameter Pav of unpenetrating fine pores is more than 100 µm, the microporous plastic film has insufficient strength and poor surface appearance. The average pore diameter Pav of unpenetrating fine pores is preferably 25-80 µm, more preferably 30-60 µm.

The unpenetrating fine pores having the average depth Dav, the maximum depth Dmax and the average pore diameter Pav described above preferably have as narrow depth distribution and pore diameter distribution as possible. To this end, the high-hardness, fine particles 10b of the pattern roll 10 preferably have as narrow a particle size distribution as possible.

When the distribution density Ds of unpenetrating fine pores is less than 500/cm², the microporous plastic film does not have sufficient easiness to tear. On the other hand, when the distribution density Ds is more than 40,000/cm², the microporous plastic film has insufficient strength. The distribution density Ds of unpenetrating fine pores is preferably 1000-20,000/cm², more preferably 2000-10,000/cm².

When a microporous plastic film having only unpenetrating pores is used as an easy-to-tear plastic film for wrapping dry foods, etc., a print layer, a gas barrier layer and a heat-sealing layer are preferably formed on a rear surface (having no unpenetrating fine pores) of the microporous plastic film. The gas barrier layer may be an aluminum foil, a vapor-deposited aluminum layer, or a vapor-deposited, transparent inorganic oxide layer. The vapor-deposited, transparent inorganic oxide layer may be a vapor-deposited layer of silicon oxide or alumina. When high gas barrier is not required, the gas barrier layer may be omitted. The heat-sealing layer necessary for sealing a bag of a microporous plastic film may be formed by low-density polyethylene (LDPE), unoriented polypropylene (CPP), ethylene-vinyl acetate copolymer (EVA), etc. The heat-sealing layer may be as thick as about 20-60 µm.

Effects of the Invention

In the apparatus of the present invention has a structure comprising a pattern roll and an anvil roll rotatably supported by stationary frames, and a lower backup roll movable up and down along movable frames, with the anvil roll pressed upward by the lower backup roll to form large numbers (pluralities) of fine pores in a plastic film passing through a gap between the pattern roll and the anvil roll, the horizontal inclination angle of the lower backup roll to the anvil roll can be quickly changed by the rotation of the movable frames. As a result, the optimum horizontal inclination angle of the lower backup roll can be quickly set depending on the characteristics (opening diameters, depths, areal density, etc.) of fine pores. Because the pattern roll and the anvil roll are kept in parallel while the lower backup roll horizontally rotates, a slanting force is not applied to the plastic film, which is unlikely subjected to strain or rupture even when the quick horizontal rotation of the lower backup roll is conducted.

The apparatus of the present invention can be used to form not only penetrating pores but also unpenetrating pores in the plastic film. Microporous plastic films having penetrating pores are suitable as films for wrapping breads, cookies, vegetables, fermented foods such as fermented soybeans and kimchi, etc., which require proper air permeability and moisture permeability. Also, microporous plastic films having only unpenetrating pores are suitable as easy-to-tear plastic films for wrapping dry foods such as instant coffee, powdered milk, tea, etc., which can be easily torn from any point while completely preventing the permeation of oxygen, moisture, etc.

DESCRIPTION OF REFERENCE NUMERALS

10: Pattern roll
10a: Roll body
10b: High-hardness, fine particle
10c: Plating layer
11: Bearing
20: Anvil roll
20a: Roll body
21: Bearing
22: Guide member
30: Lower backup roll
31: Bearing
32: Guide member
40: Stationary frame
41: Fixing plate
46: Bracket
44: Upper vertical guide rail
45: Lower vertical guide rail (first vertical guide rail)
50: Movable frame
51: Bracket
54: Second vertical guide rail
55: Movable plate
56: Horizontal plate
57: Guide block
57a: Guide groove
60: Base
61: Flat plate
62: Circularly curved guide rail
70: First driving means
71: Motor
72: Shaft of motor
73: Reduction gear
74: Frame
75: Connector plate
76: Bolt
77: Flat plate
80: Second driving means
81: Gear box
82: Reduction gear
83: Motor
84: Screw jack
85: Mail screw member
86: Buffer
90: Third driving means
91: Motor
92: Reduction gear
93a: First rotation shaft (shaft of reduction gear)
93b: Second rotation shaft
93c: Third rotation shaft
94: Coupling device
95a: First gear
95b: Second gear
95c: Third gear
95d: Fourth gear
95e: Fifth gear
96: Chain
100: Fourth driving means
101: Motor
102: Reduction gear
111: Vertical column
111a: Inner-side surface of vertical column
113: Planar bracket fixed to inside surface of vertical column
120: Horizontal beam
140: Guide roll
145: Sensor
151: Reel around which plastic film is wound
152: Reel around which microporous plastic film is to be wound
160: Upper backup roll
161: Bearing
162: Guide member
170: Fifth driving means
171: Motor
172: Reduction gear
173: Screw jack
174: Mail screw member
175: Buffer
F: Plastic film
Fa: Microporous plastic film
$F_1$: Fine pore
G: Gap between pattern roll and anvil roll
θ: Horizontal inclination angle of lower backup roll to anvil roll

What is claimed is:

1. An apparatus for producing a microporous plastic film comprising
a pair of laterally arranged vertical columns;
a pair of laterally arranged stationary frames each fixed to each vertical column such that they are positioned inside said vertical columns;
first vertical guide rails each attached to a one-side surface of each of said stationary frames;
a pair of laterally arranged movable frames rotatable under said stationary frames;
a pattern roll having a plurality of high-hardness, fine particles at random on a rolling surface and rotatably supported by said stationary frames at a fixed position;
an anvil roll movable up and down along said first vertical guide rails under said pattern roll;
second vertical guide rails each attached to a one-side surface of each of said movable frames;
a lower backup roll movable up and down along said second vertical guide rails to push said anvil roll from below;
rolls for passing said plastic film through a gap between said pattern roll and said anvil roll;
a first motor for rotating said movable frames; and
second motor each mounted to each of said movable frames to move said lower backup roll up and down;
said pattern roll being in parallel with said anvil roll;
said first and second vertical guide rails being distant from said vertical columns on one side, such that said movable frames and said lower backup roll do not come into contact with said vertical columns when they are rotated; and
with said anvil roll elevated by the pressing of said lower backup roll, and said lower backup roll inclined to said anvil roll in a horizontal plane by the operation of said first motor, said plastic film passing through a gap between said pattern roll and said anvil roll, so that pluralities of fine pores are formed in said plastic film by said high-hardness, fine particles.

2. The apparatus for producing a microporous plastic film according to claim 1, wherein a pair of said movable frames are rotated by said first motor along a pair of laterally arranged, horizontal, circularly curved guide rails.

3. The apparatus for producing a microporous plastic film according to claim 2, wherein movable plates, to which said movable frames are fixed, are fixed to both ends of a horizontal plate connected to said first motor; and each of said circularly curved guide rails engages a guide groove on a bottom surface of each of said movable plates.

4. The apparatus for producing a microporous plastic film according to claim 1, wherein said apparatus further comprises a third motor for simultaneously rotating said pattern roll and said anvil roll; and a fourth motor for rotating said lower backup roll.

5. The apparatus for producing a microporous plastic film according to claim 1, wherein said apparatus further comprises a sensor disposed downstream of the gap between said first roll and said second roll for observing the characteristics of fine pores in the resultant microporous plastic film; and a controller receiving an output signal of said sensor for generating a signal for adjusting the horizontal inclination angle of said lower backup roll to said anvil roll, to obtain desired characteristics of fine pores.

6. The apparatus for producing a microporous plastic film according to claim 5, wherein the formation of fine pores in said plastic film is started in a state where the horizontal inclination angle of said lower backup roll to said anvil roll is 0°, and said first motor is then operated according to signals output from said sensor.

7. The apparatus for producing a microporous plastic film according to claim 1, wherein said high-hardness, fine particles of said pattern roll have sharp edges and Mohs hardness of 5 or more, and the area ratio of said high-hardness, fine particles on a rolling surface of said pattern roll is 10-70%.

8. The apparatus for producing a microporous plastic film according to claim 1, wherein said apparatus further comprises an upper backup roll for pressing said pattern roll downward.

* * * * *